United States Patent [19]

Idenawa et al.

[11] Patent Number: 4,875,063

[45] Date of Patent: Oct. 17, 1989

[54] ELECTROSTATIC RECORDING APPARATUS

[75] Inventors: Hiroyuki Idenawa, Hiratsuka; Hideaki Mochimaru, Yokohama; Hajime Kanda; Nobuhiro Makita, both of Tokyo; Yoshiaki Tanaka, Kawasaki; Takahiro Yagisita, Yokohama; Takanori Yamaki, Tokyo; Takeshi Motohashi; Masayoshi Miyamoto, both of Yokohama; Hisao Ishizu, Tokyo; Yasuhiro Sagawa, Yamato; Tadaaki Kanno, Yokosuka; Tomoo Sankoda, Yamato; Hiroshi Hosokawa, Yokohama; Hideo Aoki, Yokohama; Takami Suzuki, Yokohama; Hiromi Takada, Yokohama; Toshio Shimazaki, Tokyo, all of Japan

[73] Assignee: Ricoh Company, Ltd., Tokyo, Japan

[21] Appl. No.: 91,751

[22] Filed: Sep. 1, 1987

[51] Int. Cl.[4] ............................................ G01D 15/00

[52] U.S. Cl. ............................ 346/160.1; 346/153.1; 346/160

[58] Field of Search ..................... 346/160, 160.1, 150, 346/153.1; 355/3 DD, 3 R; 400/119

[56] References Cited

U.S. PATENT DOCUMENTS

| | | | |
|---|---|---|---|
| 3,966,316 | 6/1976 | Pfeifer et al. | 355/3 R |
| 3,985,436 | 10/1976 | Tanaka et al. | 335/8 |
| 4,236,807 | 12/1980 | Kuehnle | 335/3 R |
| 4,538,896 | 9/1985 | Tajima et al. | 355/3 R |
| 4,609,276 | 9/1986 | Mitzutani et al. | 355/3 R |
| 4,710,016 | 12/1987 | Waatanabe | 355/4 |

*Primary Examiner*—Arthur G. Evans
*Attorney, Agent, or Firm*—Copper & Dunham

[57] ABSTRACT

A laser printer or like electrostatic recording apparatus of the type developing an electrostatic latent image provided on a photoconductive drum by toner which is conveyed by a developing roller. Various devices of the apparatus including the photoconductive drum and developing roller are separated into an upper and a lower unit which are openable away from each other. A photoconductive drum assembly including the photoconductive element and a developing assembly including the developing roller are individually detachable from a body of the apparatus. Various measures are taken to enhance stable and safe operation, miniaturization, easy maintenance, operability, service life, and image quality.

11 Claims, 28 Drawing Sheets

ELECTROSTATIC RECORDING APPARATUS

BACKGROUND OF THE INVENTION

The present invention relates to an improvement in an electrostatic recording apparatus which includes a photoconductive element and devices for implementing a charging, exposing, developing, transferring, fixing and other various functions, e.g. a copier, a facsimile apparatus or a printer.

A prior art electrostatic recording apparatus of the kind described has various problems left unsolved, as enumerated below.

(1) Generally, in an electrostatic recording apparatus, a latent image electrostatically formed on a photoconductive element is developed by toner which is conveyed by a developing roller. In order that an even high-quality toner image may be produced, the developing roller has to be maintained at a constant spacing from a photoconductive element. In practice, however, the developing roller is apt to move toward the photoconductive element or to oscillate, disturbing the toner image to cause so-called jitter and others. Especially, in the case than a developing device is bodily detachable relative to the photoconductive element, the tendency of the developing roller to oscillate is pronounced since the ease of attaching and detaching is preferred in such a case.

(2) In a developing system in which a photoconductive element and a developing roller are held in contact, i.e., a contact developing system, carrier and, therefore, the replacement of carrier is needless and, yet, non-magnetic toner having good fixing property is usable. Another advantage attainable with such a system is that a toner image produced appears with a sharp contour. A prerequisite with this system is maintaining a predetermined contact pressure between the photoconductive element and the developing roller. However, because the developing roller is driven by a gearing which uses a drive gear, a force which tends to thrust the developing roller aside is imparted from the drive gear to the developing roller as the load acting on the developing roller increases with the elapse of time. Such a force would increase the contact pressure to an unusual degree, thereby, lower the image quality.

(3) In an electrostatic recording apparatus of the type described, a photoconductive element, feed rollers and others are individually driven by a servo motor which is controlled to rotate at a constant speed. The constant speed control over the servo motor needs a servo circuit and other constant-speed control means. It has been customary to provide a driver stage, which includes the constant-speed control means, on a circuit board having a CPU (central processing unit) and other control circuits and independently of the servo motor, the driver stage being connected to the servo motor by a long cable. This kind of connection is disadvantageous in that an extra space for wiring is necessary which obstructs miniaturization of the recording apparatus and in that noise is apt to be picked up.

(4) In the event of inspection and repair of such an electrostatic recording apparatus, e.g., when a sheet has jammed the apparatus, it is often needed to bare an exposing unit, developing unit and others of the apparatus to facilitate serviceman's or operator's access. Such has heretofore been implemented by removing the front panel, top cover or the like of the apparatus. However, this kind of implementation cannot achieve sufficient exposure of the various units, forcing troublesome labor on the serviceman or the like.

(5) Electrostatic recording apparatuses of the kind described include a one which has a capability of detecting jams of transfer materials on a sheet transfer path. Specifically, the jam detection is such that a period of time which a transfer material of B4, A4 or like regular format takes to move past a certain point of a transport path is counted and, when the transfer material has moved past that particular point within a predetermined period of time, it is decided that a jam has not occurred while, when it has failed to do so, it is decided that a jam has occurred. A problem with such an apparatus with a jam detection capability is that the printing process cannot be effected smoothly unless the transfer material is of a regular format, i.e., an envelope or like transfer material which is irregular in size prevents the jam detection capability from being correctly executed.

(6) There is also available an electronic recording apparatus of the type having an upper and a lower unit each accommodating various devices. In this type of apparatus, the upper unit is rotatable away from the lower unit to facilitate maintenance removal of a jamming sheet, and others. When the upper unit is raised, the interior of the apparatus is exposed to the outside. Since continuing the operations of the various devices under such a bare condition is dangerous, an interlock switch is turned off in response to the upward movement of the upper unit so as to deactivate the devices. However, should the interlock switch be left exposed, a person might accidentally touch it to get into danger.

(7) In an electrostatic recording apparatus having an upper and lower unit as stated above, the two units are connected together and locked before an actual printing operation is started. A prior art device for locking the two units is implemented with pawls, hooks, knobs and others which are mounted on the units. This, however, adds to the number of parts required while rendering the production troublesome.

(8) In an electrostatic recording apparatus, various devices are usually housed in a casing so that data may be recorded by those devices on a transfer material which is fed along a predetermined transport path. Customarily, the transport path has been implemented with an exclusive rib member which is secured to the casing. The rib member, however, increase the numbers of parts as well as the number of production steps and, thereby, the cost.

(9) A paper sheet to which a toner image has been transferred by a transfer step of a series of electrophotographic process may be heated by a heat type fixing device, as well known in the art. A problem with a heat type fixing device is that it not only heats itself to an extremely high temperature but also adversely affects various nearby devices. Especially, in a recording apparatus of the type having a waste toner tank in the vicinity of such a fixing device, waste toner stored in the tank melts and adheres due to the heat.

(10) Generally, a fixing device of the kind described is controlled in temperature by use of a thermistor. So long as the transfer material used is of a comparatively large size, the position where the thermistor is disposed is not critical. However, in the case of a transfer material whose size is relatively small, should a transport path for the transfer material and the thermistor be spaced a substantial distance from each other, temperature cannot be accurately controlled in relation to the transfer material. Especially, when a pasted envelope is fed as a small-size transfer material, accurate temperature control is desired for preventing paste from melting.

(11) In an electrostatic recording apparatus of the type described, the surface of a photoconductive element is uniformly charged by the discharge of a charger before exposed imagewise. The discharge is accompanied with generation of ozone. Ozone surrounding the photoconductive element would aggravate deterioration of the photoconductive element and, in the event of maintenance, cause a serviceman to feel uneasy.

(12) An electrostatic recording apparatus of the type described includes a transfer charger which transfers a toner image from a photoconductive element to a transfer material. By such a transferring step, the transfer material is caused to electrostatically adhere to the photoconductive element. To separate the transfer material from the photoconductive element, use may be made of a pawl, as well known in the art. On the other hand, the charge on the photoconductive element is dissipated after the image transfer so as to remove remaining toner. Heretofore, the separation of a transfer material by the pawl and the charge dissipation from the photoconductive element has been performed independently of each other by exclusive devices. Such is undesirable from the space and cost standpoints.

(13) Further, there is available an electrostatic recording apparatus in which a photoconductive element and other various devices are detachably mounted on the housing of the apparatus for facilitating replacement of those elements which failed or wore out. Specifically, the structure is such that the devices are simply put in individual mounting positions of the housing. This brings about a problem that a serviceman has to start a recording operation with an uneasy conscience, i.e., without knowing if each device has been surely mounted.

SUMMARY OF THE INVENTION

It is, therefore, an object of the present invention to provide an electrostatic recording apparatus having a detachable developing device which, while preserving the ease of attachment and detachment of the device, allows a minimum of oscillation and others of a developing roller to occur to thereby promote quality recording.

It is another object of the present invention to provide an electrostatic recording apparatus capable of performing stable development with no regard to a change in the load acting on a developing roller.

It is another object of the present invention to provide an electrostatic recording apparatus capable of maintaining a constant contact pressure between a photoconductive element and a developing roller.

It is another object of the present invention to provide an electrostatic recording apparatus which is hardly susceptible to noise and, yet, miniature.

It is another object of the present invention to provide an electrostatic recording which promotes the ease of maintenance, jam processing, and others.

It is another object of the present invention to provide an electrostatic recording apparatus capable of executing a printing process without a failure even if envelopes and other transfer materials of irregular sizes are used.

It is another object of the present invention to ensure safety operation of an electrostatic recording apparatus of the type having an upper and a lower unit which are separable from each other.

It is another object of the present invention to provide an electrostatic recording apparatus with a locking mechanism which is easy to assemble and inexpensive.

It is another object of the present invention to provide an electrostatic recording apparatus with a transfer material transport path which is easy to define and inexpensive.

It is another object of the present invention to provide an electrostatic recording apparatus which prevents a heat type fixing device from heating to an unusual degree.

It is another object of the present invention to provide an electrostatic recording apparatus capable of accurately controlling the fixing temperature even if transfer materials of relatively small sizes are used.

It is another object of the present invention to provide an electrostatic recording apparatus which eliminates stagnation of ozone around a photoconductive element and other particular locations.

It is another object of the present invention to provide a cost-effective and miniature electrostatic recording apparatus.

It is another object of the present invention to provide an electrostatic recording apparatus which allows a person to decide the attached conditions of various detachable devices to the apparatus by a simple method.

It is another object of the present invention to provide a generally improved electrostatic recording apparatus.

In an electrostatic recording apparatus having a casing in which various devices for executing an electrostatic recording process are accommodated, the apparatus being capable of recording data in various kinds of transfer materials, in accordance with the present invention, the devices are separated into an upper and a lower unit. The upper and lower units are openable away from each other. At least a photoconductive element assembly and a developing assembly which are included in the device constitute the lower unit and individually detachable from a body of the apparatus.

The above and other objects, features and advantages of the present invention will become more apparent from the following detailed description taken with the accompanying drawings.

DESCRIPTION OF THE PREFERRED EMBODIMENT

Figure 1:
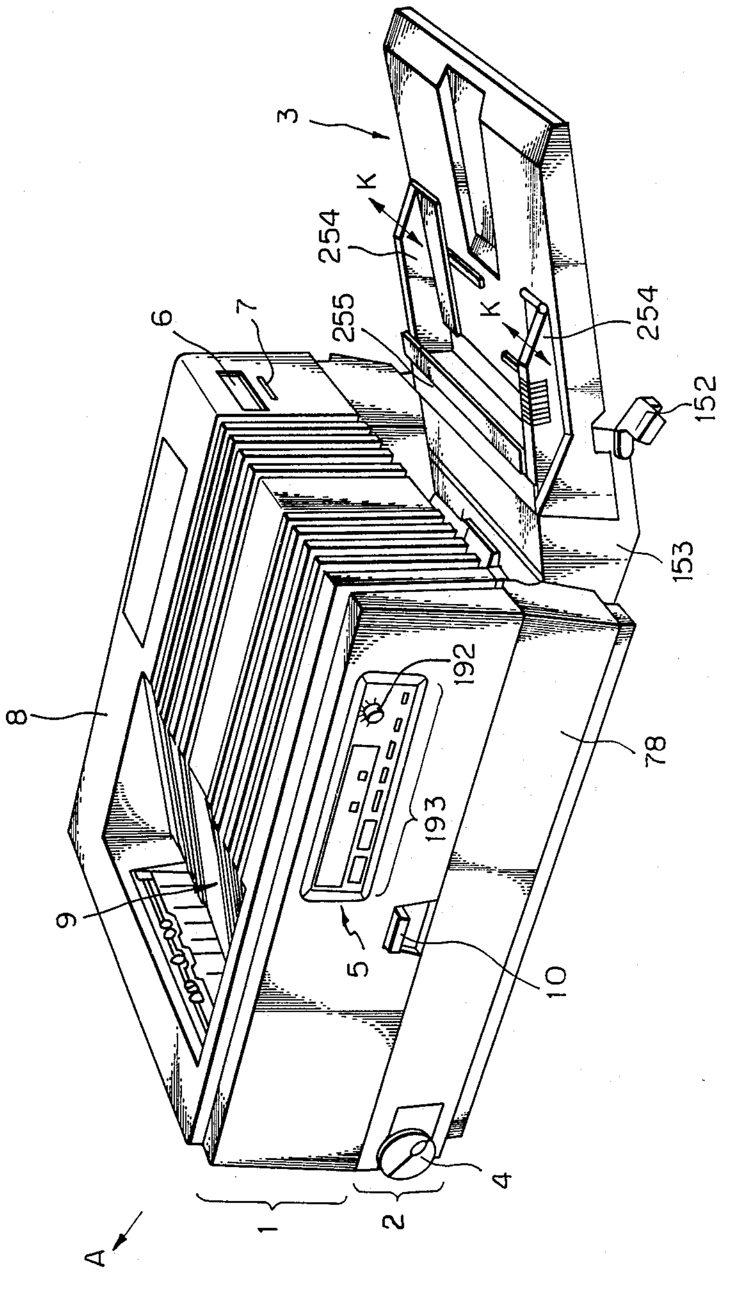
FIG. 1 is a perspective view of a laser printer which is representative of one embodiment of the present invention.

Referring to FIG. 1 of the drawings, a laser printer which is an example of electrostatic recording apparatuses and embodies the present invention is shown. The laser printer is adapted to print out characters and others on ordinary paper sheets, envelopes and other desired transfer materials in response to a command from a host computer, not shown. The laser printer generally comprises an upper unit 1 and a lower unit 2. A feed tray 3 is detachably mounted on the lower unit 2. The lower unit 2 is provided with a discharge switching knob 4. On the other hand, the upper unit 1 is provided with a control panel 5, a font cartridge inlet 6, and an emulation card inlet 7. The upper surface of a cover 8 which forms a part of the upper unit 1 constitutes a discharge tray 9.

Transfer materials are stacked on the feed tray 3. In this particular embodiment, the printer is usable with various kinds of transfer materials, i.e., from sheets of a relatively large size, or legal size, to those of a relatively small size such as envelopes. To guide such transfer materials of different sizes, guide plates 254 are movable as indicated by arrows K. The guide plates 254 are linked together on the underside of the feed tray 3 so that, when one of them is moved in one of opposite directions K, the other is automatically moved in the other of the opposite directions. Arranged on the control panel 5 are switches and others for setting up various printing conditions such as the size of transfer materials. A font cartridge, i.e., a ROM (read only memory) cartridge storing several different kinds of type data may be inserted through the font cartridge inlet 6 so as to supply a character controller, which will be described, with type data. An emulation card (ROM card) may be inserted through the emulation cartridge inlet 7 to be connected to the character controller in order to match the laser printer to the host computer, which is of a particular kind. The discharge switching knob 4 may be operated to select one of two different destinations of a transfer material which has undergone a printing process, i.e., the upper discharge tray 9 and the external space on the left-hand side of the printer as indicated by an arrow A.

Figure 2:
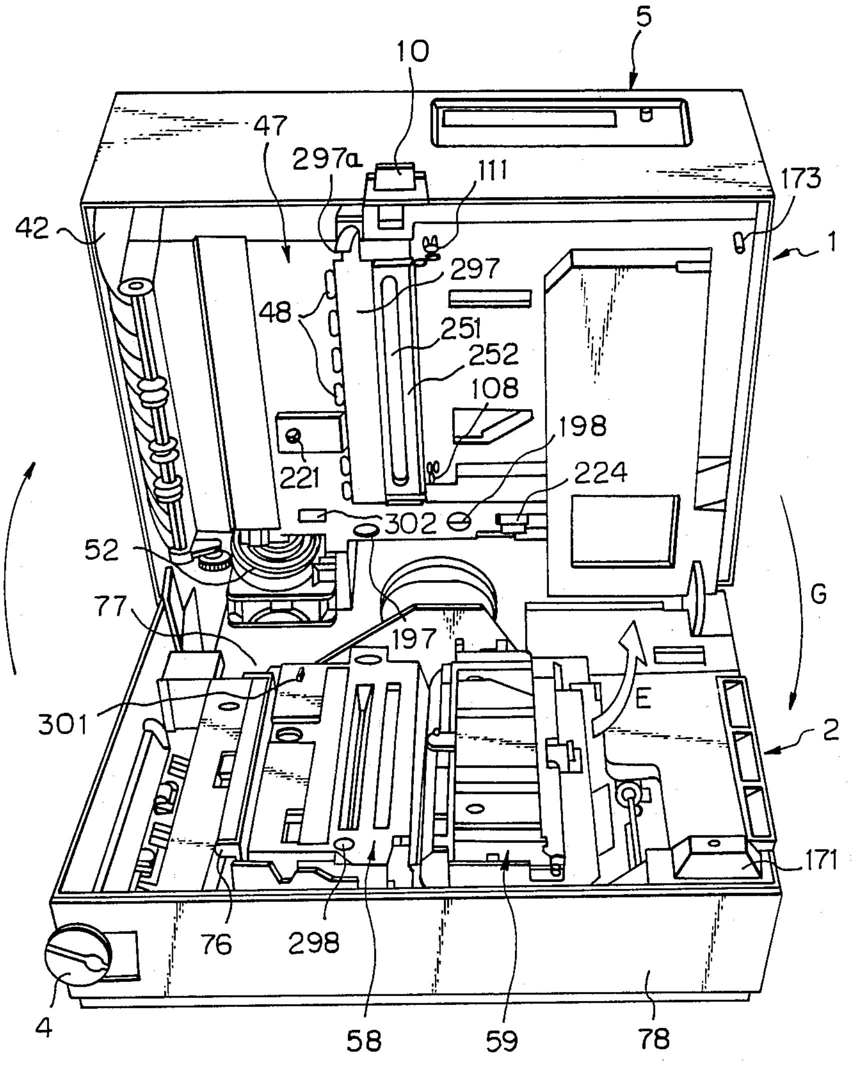
FIG. 2 is a perspective view showing the laser printer of FIG. 1 with its upper unit opened.

The upper unit 1 and the lower unit 2 are hinged together on the opposite side of the printer to the side where the control panel 5 is located, and they are fixed to each other by a locking mechanism, which will be described, on that side where the control panel 5 is located. A lock lever knob 10 which protrudes from the front of the cover 8 may be pushed upward to release the locking mechanism so as to bodily raise the upper unit 1 away from the lower unit 2, as shown in FIG. 2. Such a separable structure of the upper and lower units 1 and 2 is adapted to facilitate maintenance as well as the replacement of a photoconductive element, developer and others, as described in detail later.

Figure 3:
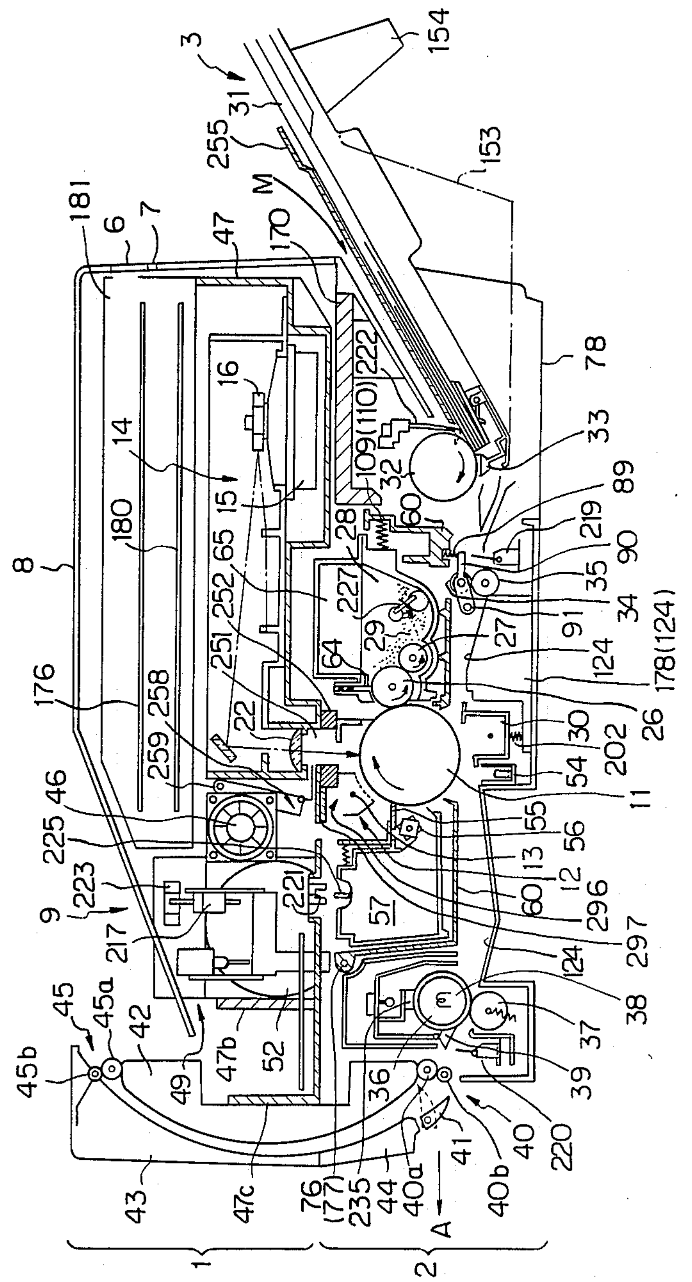
FIG. 3 is a sectional side elevation of the laser printer.

FIG. 3 is a sectional side elevation of the laser printer, showing the upper and lower units 1 and 2 connected together. The operation of the laser printer will be outlined with reference to FIG. 3.

Figure 4:
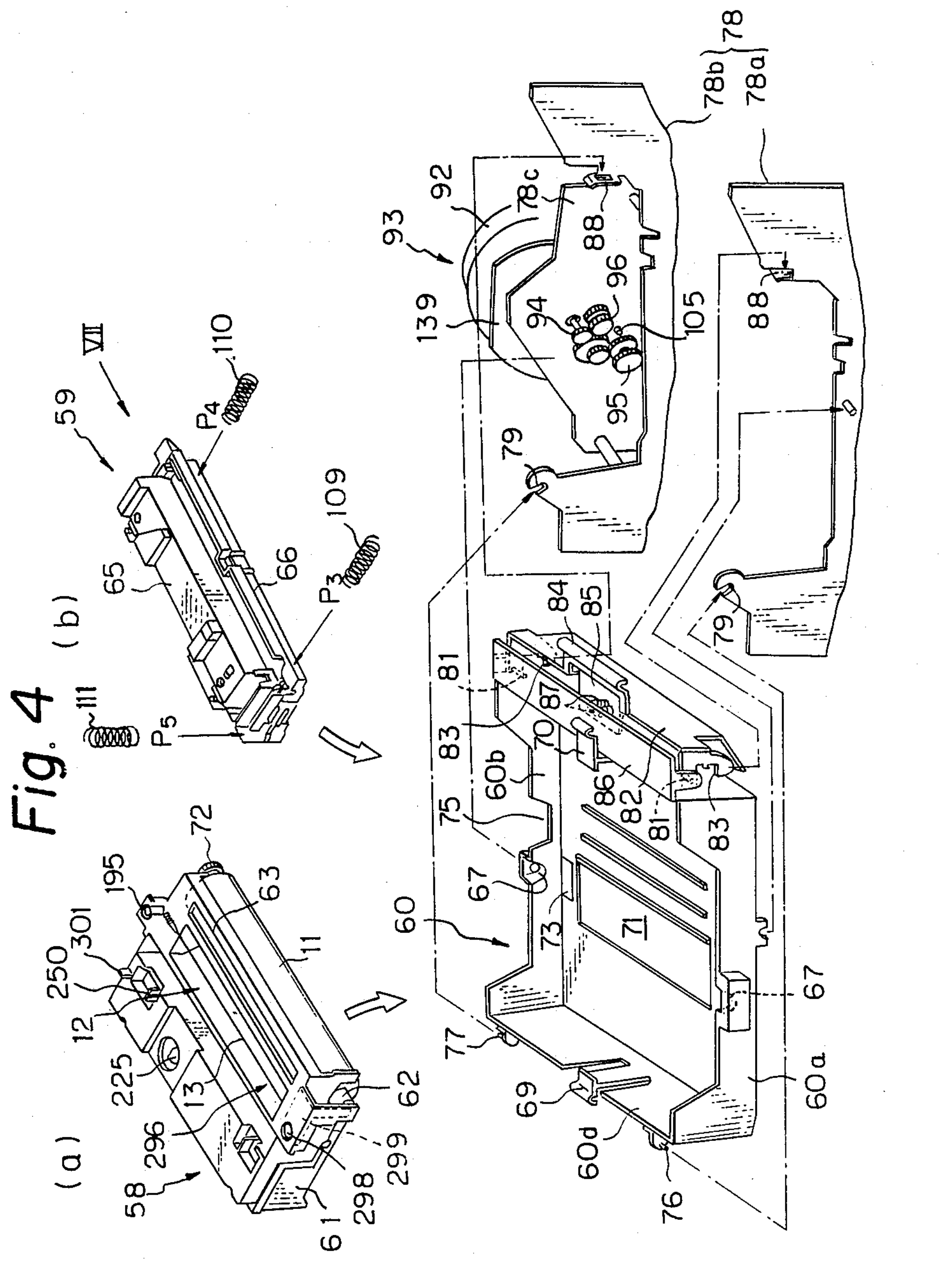
FIG. 4 is an exploded perspective view of an image-forming unit which is included in the laser printer.

A photoconductive element in a form of a drum 11 is located at substantially the center of the lower unit 2 and, while being driven clockwise in a rotational motion, charged by a charger 12 first. As shown in FIG. 4(*a*), the charger 12 has a charge wire 13 which extends parallel to the drum 11 so that the surface of the drum 11 is uniformly charged in the axial direction of the drum 11 by a discharge of the charge wire 13.

Figure 5:
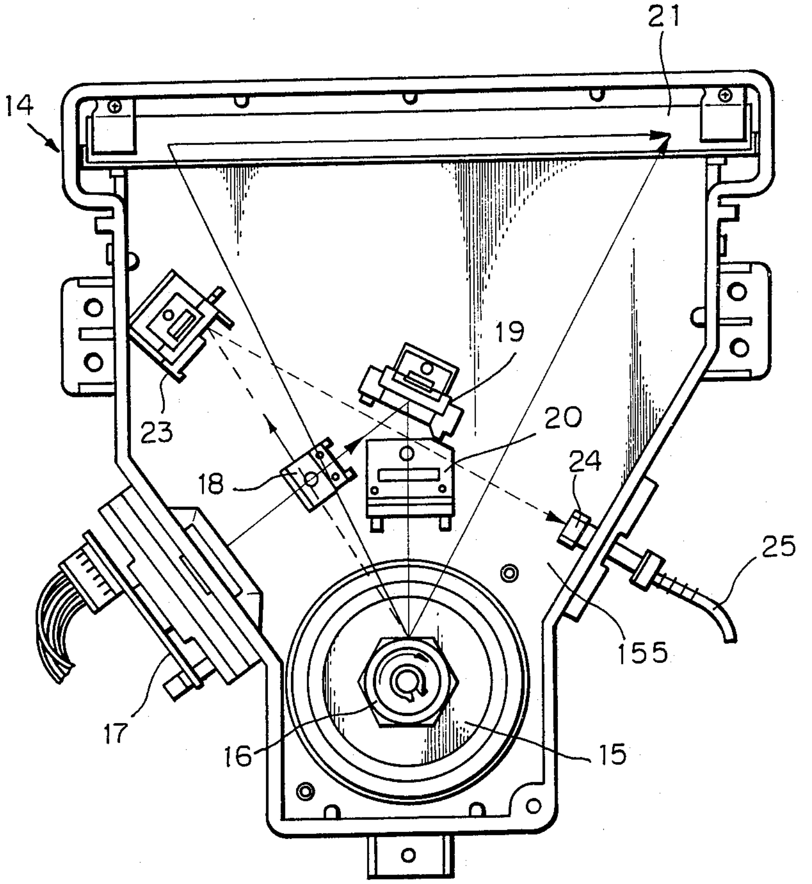
FIG. 5 is a plan view of an optical device including a laser.

Then, the drum 11 is exposed image-wise by a laser optical device 14. As shown in FIG. 5, the laser optical device 14 includes a polygon mirror 16 which is rotated clockwise by a scanner motor 15, a laser diode (LD) unit 17, a first cylindrical lens 18, a first mirror 19, a spherical lens 20, and a second mirror 21.

Figure 6:
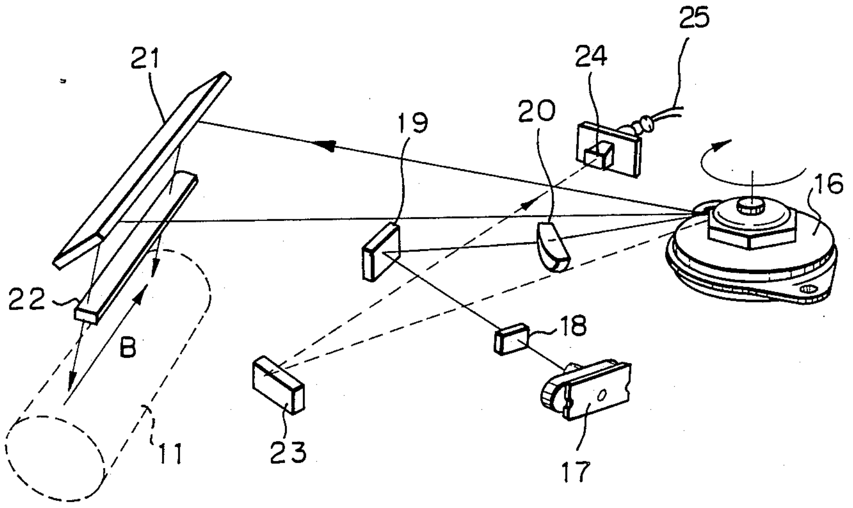
FIG. 6 is a view showing an optical path which is defined in the optical device.

A laser diode is disposed in the LD unit 17 to emit a laser beam in response to an image signal, which will be described. As shown in FIG. 6, the laser bean is incident to the spherical lens 20 by way of the first cylindrical lens 18 and first mirror 19. The laser beam is regulated by the spherical lens 20 to be refracted by about 5 degrees upward toward one surface of the polygon mirror 16. Because the beam incident to the polygon mirror 16 has been refracted upward by the spherical lens 20, the beam reflected by the polygon mirror 16 propagates along a path above the incident beam. The laser beam from the polygon mirror 16 is further reflected by the second mirror 21 to reach the drum 11 through the second cylindrical lens 22, the drum 11 being irradiated on a dot-by-dot basis. In this instance, while the polygon mirror 16 is rotated, the laser beam scans the second mirror 21 and, therefore, the drum 11 as indicated by an arrow B (main scanning). By the main scanning, a dot line is formed on the drum 11. The main scanning is repeated for each of the surfaces of the polygon mirror 16 and, at the same time, the drum 11 is rotated in a direction perpendicular to the direction of main canning (subscanning). As a result, a latent image is electrostatically formed on the surface of the drum 11 as represented by an image signal. In this particular embodiment, the main and subscanning are performed such that the dot density of a latent image is 300 dots per inch. An image printed out on the basis of such a high-density dot image is as clear-cut as an image which is obtainable with a so-called impact system. Further, in this embodiment, each surface of the polygon mirror 16 is curved to provide a flat scanning image plane on the second mirror 21. This eliminates the need for an f-theta lens heretofore interposed between the polygon mirror 16 and the second mirror 21, thereby considerably miniaturizing the overall configuration of the laser optical device 14.

The LD in the LD unit 17 is adapted to detect, once per scanning, a laser beam which is independent of the laser beam for writing an image signal as described above. Specifically, adapted for the detection of synchronization, the beam to be detected by the LD is reflected by the polygon mirror 16 and, then, incident to an optical fiber 25 by way of a third mirror 23 and a third cylindrical lens 24. The optical fiber 25 is connected to a main controller, which controls the operations of the entire printer and will be described. The laser beam fed to the main controller through the optical fiber 25 is used to control the lasing start time of the image signal writing laser beam.

In FIG. 3, the latent image formed on the drum 11 by the laser optical device 14 is brought to the developing roller 26 as the drum 11 is rotated. In this embodiment, a so-called contact developing system is adopted, i.e., the developing roller 26 is rotated counterclockwise in light contact with the drum 11. A toner supply roller 27 is located in a bottom portion of a developing tank 28 and rotated counterclockwise to convey non-magnetic toner 29 from the tank 28 to the developing roller 26. In this condition, the latent image on the drum 11 which has reached the developing roller 26 is developed by the toner to become a toner image. An advantage attainable with this kind of developing system is the simple toner composition since a one-component developer which is constituted by non-magnetic toner is used in place of magnetic toner. Another advantage is that because carrier is not used, the replacement of carrier which is necessary in the case a two-component developer is needless. Still another advantage is that non-magnetic toner promotes the ease of fixing operation, which will be described, and allows a fixing device to have a simple and miniature configuration correspondingly. In addition, non-magnetic toner renders the contour of a toner image clear-cut and, thereby, provides an image of higher quality than a one-component developer which uses magnetic toner.

As the drum 11 is further rotated, the toner image is transported to a transfer station where it faces a transfer charger 30. The reference numerals 64 and 65 designate, respectively, a toner layer regulating blade and a toner cartridge.

While the process described so far is under way, the uppermost one of paper sheets or like transfer materials 31 stacked on the feed tray 3 is separated from the others by a feed roller 32 which is driven clockwise and a friction pad 33, the paper sheet 31 separated being fed toward nipping portions of upper and lower transport rollers 34 and 35 and, therefrom, toward the transfer station.

At the transfer station, the paper sheet 31 is superposed on the toner image which is provided on the drum 11 and, then, the transfer charge 30 is energized to discharge, whereby the toner image is transferred from the drum 11 to the paper sheet 31. Upon completion of the image transfer, a lamp 54 which is positioned next to the transfer charger 30 and constituted by LEDs (light emitting diodes) illuminates the drum 11 through the paper sheet 31. This removes the surface potential of the drum 11 which moves past a particular position which the lamp 54 illuminates.

As the potential of the drum 11 is reduced, the electrostatic adhesion acting between the drum 11 and the paper sheet 31 is weakened to allow the paper sheet 31 to positively separate itself from the drum 11 by gravity. Then the paper sheet 31 is fed to a fixing device which has a heating roller 36 and a pressing roller 37. The paper sheet 31 and the toner image carried on the paper sheet 31 are heated by the heating roller 36 and, at the same time, compressed by the rollers 36 and 37 from the above and below. As a result, the toner image is fixed on the paper sheet 31. A heater 38 is disposed in the heating roller 36 for the purpose of heating the roller 36.

The paper sheet 31 undergone the fixing step as stated above is separated from the heating roller 36 by a separator pawl 39 and, then, delivered to a discharge roller 40. A selector pawl 41 is located after the discharge roller 40 in such a manner as to selectively assume a solid line and a phantom line position as shown in FIG. 3 when the discharge switching knob 4 of FIGS. 1 and 2 is rotated. Specifically, when the selector pawl 41 is in the solid line position, the paper sheet coming out from the discharge roller 40 is routed through a transport path which is defined by a discharge guide member 42 and discharge guide plates 43 and 44 and, then, driven by a discharge roller 45 to the discharge tray 9. On the other hand, when the selector pawl 41 is in the phantom line position, the paper sheet 31 is discharged straight to the outside of the printer, as indicated by an arrow A.

The operator may select any of the above-mentioned two different destinations by operating the switching knob 4. Generally, when it is desired to print out information on ordinary paper sheets which are comparatively pliant in order of page and, then, stack them in order of page, the paper sheets are routed to the discharge tray 9. Conversely, when use is made of envelopes and others which are comparatively stiff, they are discharged straight to the outside.

After image transfer, that part of toner which has not contributed to the image transfer remains on the drum 11. This remaining toner is illuminated by the previously mentioned lamp 54 together with the drum 11, then scraped off by a cleaning blade 55, and then returned to a toner collecting tank 57 by a toner collecting roller 56. The drum 11 cleaned by the cleaning blade 55 is ready to be charged again by the charger 12.

In this particular embodiment, the fixing roller 36 is provided with a conductive surface so that the charge on the paper sheet 31 may be dissipated through the fixing roller 36 during the fixing operation. This eliminates the need for an exclusive discharge brush which has heretofore been used to remove the charge on a paper sheet immediately before the paper sheet is driven to the outside for stacking such sheets orderly. To provide the fixing roller 36 with conductivity, carbon may be mixed with a base material of the roller which may comprise teflon. Because carbon has relatively great hardness, such an implementation also serves to enhance the durability of the roller.

The feed tray 3 is detachable from the lower unit 2 of the printer. As shown in FIG. 1, that part 153 of the feed tray 3 which is provided with a pressing lever 152 is bulged downward and, therefore, the bottom of the feed tray 3 is not flat. Hence, should the feed tray be removed from the lower unit 2 and let alone, the rear part of the feed tray 3 might be lowered like a see-saw to shift the paper sheets 31 rearward. In the light of this, as shown in FIG. 3, the feed tray 3 is provided with a projection 154 on its bottom and at the rear of the bulged portion 153.

The operation of the laser printer embodying the present invention has been outlined above. The various sections of the printer will hereinafter be described in detail.

IMAGE-FORMING SECTION

In this embodiment, the drum 11, charger 12 and toner collecting tank 57 of FIG. 3 are configured in a single unit (photoconductive element or drum unit 58), as shown in FIG. 4(*a*). Likewise, the developing roller 26, toner supply roller 27 and developing tank 28 are configured in a single unit (developing unit 59), as shown in FIG. 4(*b*). The drum unit 58 and the developing unit 59 are individually detachably supported by an image-forming unit case 60.

The drum unit 58 includes a box-like case 61 to which a shaft 62 of the drum 11 is rotatably and detachably mounted. The case 61 is provided with a slot 63 through which the laser beam from the laser optical device 14, FIG. 3, enters the drum unit 58. The case 61 itself defines the toner collecting tank 57, FIG. 3, while constituting a casing of the charger 12, i.e., a wall surrounding the charge wire 13. The cleaning blade 55 and toner collecting roller 56 are individually supported by the casing 51. Why the drum 11 is detachably mounted to the case 61 and, therefore, to the toner collecting tank 57 is as follows. Generally, the toner collecting tank 57 is replaced with a new one when filled with waste toner. If the drum 11 and the toner collecting tank are constructed integrally with each other, the drum 11 has to be discarded together with the tank 57. Today, however, the service life of drums is remarkably increasing due to the improvement in material, producing method, and others. Therefore, using a drum until its life expires is impracticable without the need for a toner collecting tank having an extremely large capacity which in turn increases the overall dimensions of the printer. In this particular embodiment, the toner collecting tank 57 alone can be replaced so as to achieve two objectives at the same time, i.e., miniaturization of a printer and effective use of a drum.

The developing unit 59 includes a case 66 which defines the developing tank 28, FIG. 3. The developing roller 26 and the toner supply roller 27 are rotatably supported by the case 66. A toner cartridge 65 is detachably mounted on the case 66. As the amount of toner remaining in the developing tank 28 becomes short, the cartridge 56 is replaced with a fresh one to supply toner to the tank 28.

The unit case 60 is disposed in the lower unit 2 of the printer. Hence the drum unit 58 and developing unit 59, too, are arranged in the lower unit 2. When the upper unit 1 is raised as shown in FIG. 2, the upper portions of the units 58 and 59 are exposed to the outside.

(Mounting drum unit 58 and developing unit 59 on unit case 60).

As shown in FIG. 4, the unit case 60 comprises an top-open box-like configuration. A front and a rear wall 60*a* and 60*b*, respectively, of the unit case 60 are provided with a groove-like support portion 67 each. The support portions 67 are adapted to support the shaft 62 of the drum 11. The drum unit 58 supported by the support portions 67 on one hand is pressed by a stop pawl 69 on the other hand. Likewise, the developing unit 59 is received in the unit case 60 and pressed by a stop pawl 70. Made of a flexible material each, the stop pawls 69 and 70 are individually deformable outward when their associated units 58 and 59 are inserted in the unit case 60, so as not to interfere with the insertion.

When the drum unit 58 is mounted in the unit case 60, the drum 11 is partly received in an opening 71 which is formed through the bottom of the unit case 60 while, at the same time, a gear 72 mounted on the drum shaft 62 is received in a small opening 73.

Figure 7:
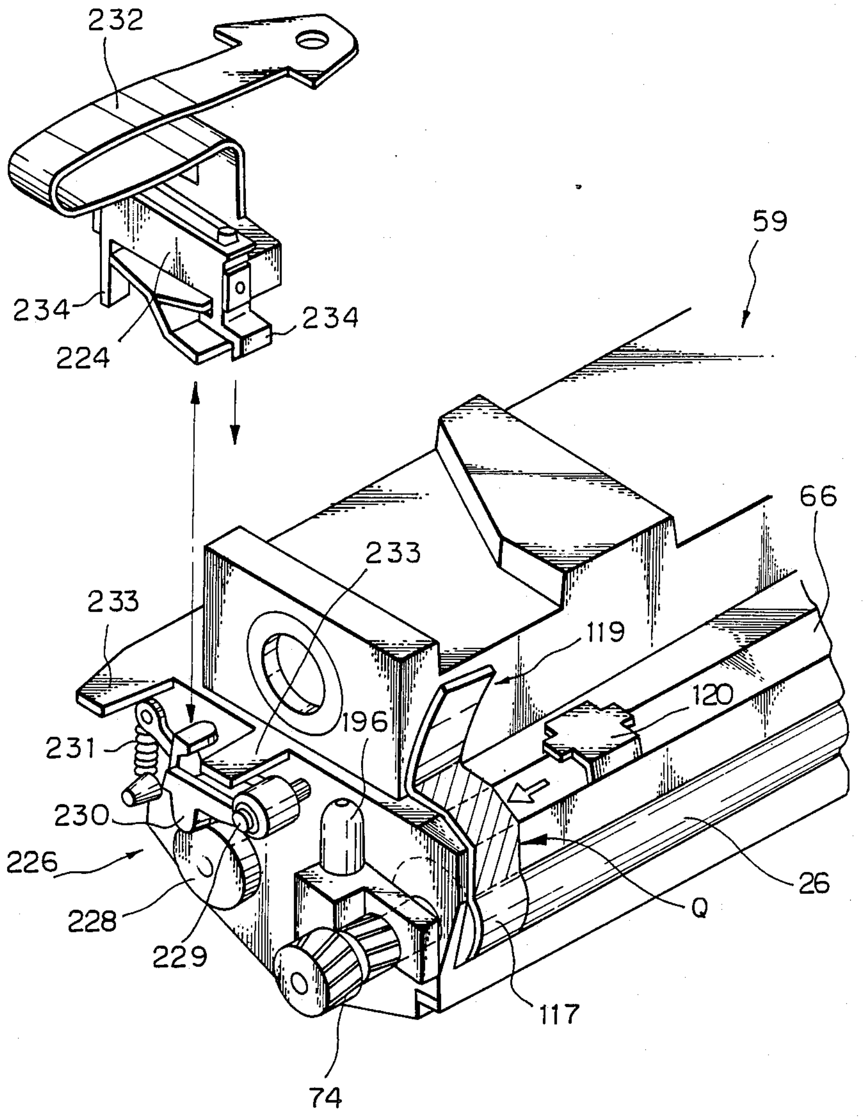
FIG. 7 is a fragmentary perspective view of a developing unit.

When seen in a direction indicated by an arrow VII in FIG. 4(*b*), the developing unit 59 appears as shown in FIG. 7. As shown, a gear 74 is mounted on one end of the shaft of the developing roller 26. In the event when the developing unit 59 is mounted in the unit case 60, the gear 74 projects outward from a recess 75, FIG. 4, which is provided in the rear wall 60*b* of the unit case 60.

Figure 35:
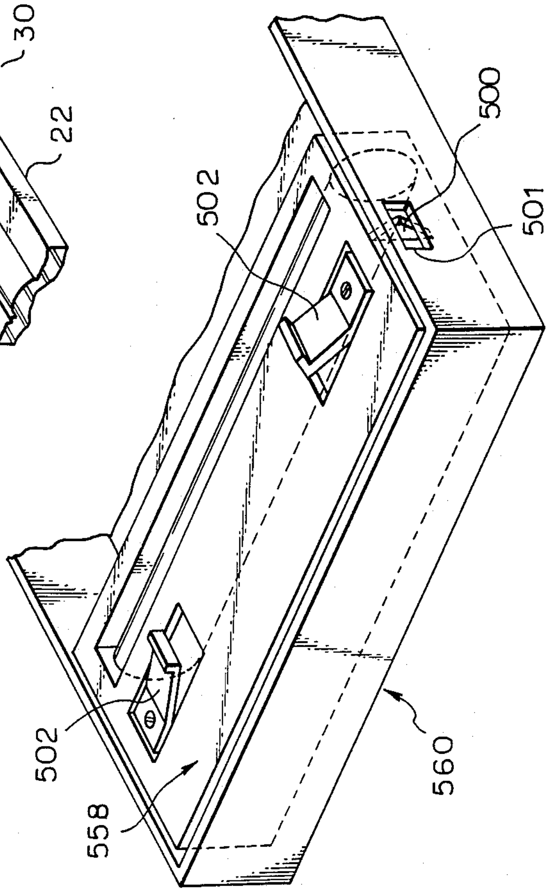
FIG. 35 is a perspective view showing a specific manner of attaching a detachable photoconductive element unit.

FIG. 35 shows another preferred arrangement for mounting the drum unit to the image-forming unit case. Although a drum unit 558 and a unit case 560 shown in FIG. 35 are different in shape from the drum unit 58 and the unit case 60 of FIG. 4, such is simply intended to facilitate an understanding of the following description and the method which will be described is naturally applicable to the drum unit 58 and others of FIG. 4 also.

Figure 36:
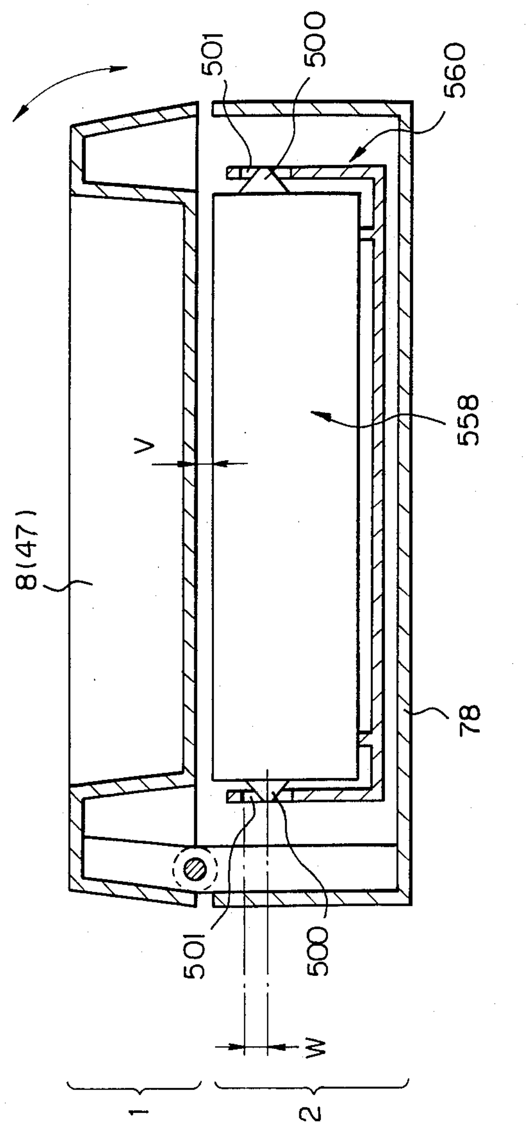
FIG. 36 is a section showing a condition in which the photoconductive element unit is fully attached in the manner as shown in FIG. 35.

As shown in FIG. 35, the drum unit 558 is provided with a triangular lug 500 at its side which may be molded integrally with a case (which corresponds to 61 of FIG. 4(*a*)) by using resin. As shown in FIG. 36, the lug 500 is provided on both sides of the drum unit 558 and not on one side only.

The unit case 560 is provided with slots 501 which individually face the lugs 500 when the drum unit 558 is mounted in the unit case 560. Each of the slots 501 has a width, as measured in the up-down direction, which allows a part of the apex side of the lug 500 to enter (see FIG. 36).

As the operator mounts the drum unit case 558 in the image-forming unit case 560 holding knobs 502, the lugs 500 individually urge the flexible unit case 560 outward first. As soon as the lugs 500 reach the slots 501, the unit case 560 elastically regains its original position so that its slots 500 are instantaneously mated with their associated lugs 500 to fix the latter in place. Because the mating of the slots 501 with the lugs 500 occurs instantaneously and forcibly due to the elasticity of the unit case 560, the operator can sense it as a click and, therefore, confirm that the drum unit 558 is surely mounted in the unit case 560.

Further, as shown in FIG. 36, assume that the gap defined between the top of the drum unit 558 and the bottom of the printer lower unit 2 (usually the bottom of the upper unit frame 47) when the drum unit 558 is settled in a predetermined position in the printer lower unit 2 is V, and that the dimension as measured from the center (apex) of each lug 500 to the upper end of the associated slot 501 is W. Then, it is preferable that a relationship V<W be set up. This is because even if the drum unit 558 is not completely mounted in the unit case 560, i.e., even if the lugs 500 and the slots 501 are not fully mated, the bottom of upper unit 1 presses the top of the drum unit 558 when the upper unit 1 is closed, resulting that the drum unit 558 is automatically received in the unit case 560 before the upper unit 1 is fully closed.

(Mounting unit case 60 to lower unit 2)

Turning back to FIG. 4, a pair of pivot pins 76 and 77 are provided on a left wall 60*d* of the image-forming unit case 60. The pivot pins 76 and 77 are individually mated with recesses 79 which are formed in opposite side plates 78*a* and 78*b* of the frame 78 of the lower unit 2, FIGS. 1 and 3. In this configuration, the unit case 60 can be raised about the pivot pins 76 and 77 with the drum unit 58 and developing unit 59 accommodated in the unit case 60, as indicated by an arrow E in FIG. 2. In this instance, because the transport path is defined below the unit case 60, as shown in FIG. 3, raising the unit case 60 as mentioned above exposes the transport path and allows a sheet jamming the path to be removed with ease. If necessary, the unit case 60 may be bodily removed from the printer lower unit 2.

In FIG. 4, a pair of pins 81 are provided on the right end of the unit case 60 while a member 82 is rotatably supported by the pins 81. A pair of lock pawls 83 and a knob 84 are formed integrally with the rotatable member 82. Compression springs 87 are loaded between a seat portion 85, which is formed by cutting and bending a part of the unit case 60, and a horizontal portion 86 which is disposed at the right end of the unit case 60. The compression springs 87 constantly urge the rotatable member 82 toward the unit case 60.

Each lower frame side plates 78*a* or 78*b* is provided with an opening 88. When the unit case 60 is mounted in the position of FIG. 3, the lock pawls 83 are individually mated with the openings 88 by the action of the springs 87. As shown in FIG. 3, a compression spring 89 is disposed below the right end of the unit case 60 in such a manner as to urge a lever 90 at its lower end. Hence, when the unit case 60 is held in the position of FIG. 3, the unit case 60 is urged counterclockwise about the pins 76 and 77 by the spring 89 resulting that the lock pawls 83 are pressed against the upper ends of their associated openings 88, whereby the unit case is surely locked in place.

The lever 90 is rotatably supported by the lower frame 78 by a pin 91 and in turn rotatably supports the upper transport rollers 34, which are adapted to transport the paper sheet 31. As the unit case 60 is brought to the predetermined position as shown in FIG. 3, the spring 89 urges the lever 90 so that the upper and lower transport rollers 34 and 35 are pressed against each other to transport the paper sheet 31. When the unit case 60 is raised as indicated by the arrow E in FIG. 2, the force exerted by the spring 89 on the lever 90 is cancelled. This allows a paper sheet jammed between the rollers 34 and 35 to be removed with ease.

(Relation with driving section)

As shown in FIG. 4, another frame side plate 78*c* is fixed to the lower frame side plate 78*b*. A main motor unit 93 which includes a main motor 92 is mounted on the frame side plate 78*c*. A driving gear 94 is mounted on the output shaft of the main motor 92 so as to drive a drum drive gear 95 and a developing roller drive gear 96 through individual gear trains.

When the unit case 60 is held in the predetermined position as shown in FIG. 3, the gear associated with the drum 11, FIG. 4*a*, is meshed with the drum drive gear 95 while the gear 74 associated with the developing roller 26, FIG. 7, is meshed with the developing roller drive gear 96. As the main motor 92 is energized, it causes the drum 11 and the developing roller 26 to rotate.

(Support for developing unit 59)

Figure 8:
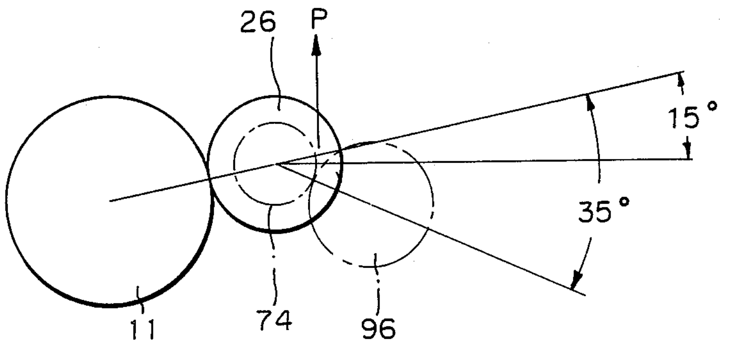
FIG. 8 is a schematic diagram showing intermeshing of gears.

While the unit case 60 is mounted, the drum 11 and the developing roller 26 make contact with each other and the gears 74 and 96 are meshed with each other, as shown in FIG. 8. In the positional relationship shown in FIG. 8, when the drive gear 96 drives the gear 74, a force P exerted by the drive gear 96 on the gear 74 and, therefore, on the developing roller 26 acts in the vertical direction and not in the horizontal direction. This frees the contact pressure acting between the developing roller 26 and the drum 11 from adverse influence of the force of the driving system.

Figure 9:
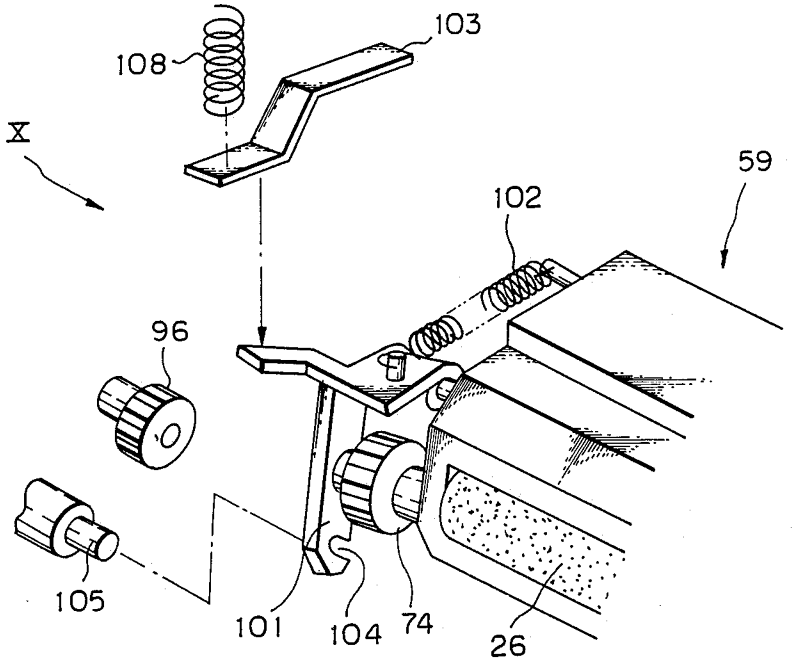
FIG. 9 is a fragmentary perspective view of another part of the developing unit.

As shown in FIG. 9, a lock lever 101 is rotatably mounted on the shaft of the developing roller 26 in addition to the gear 74. A tension spring 102 is anchored to an upper portion of the lock lever 101 so that, when the developing unit 59 is not mounted in the unit case 60, FIG. 4, and in other similar cases, the lock lever 101 is held in a raised position by the spring 102.

Figure 10:
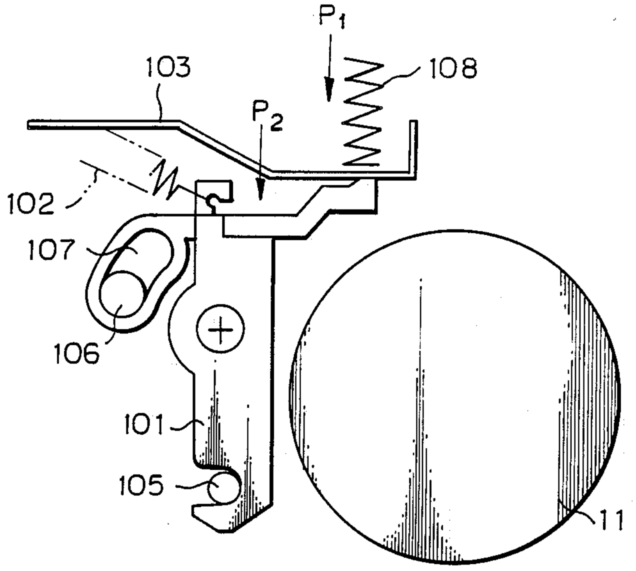
FIG. 10 is a view of the developing unit as seen in a direction X of FIG. 9.

When the upper unit 1 is closed with the developing unit 59 positioned as shown in FIG. 3, a leaf spring 103 provided in the upper unit 1 abuts against the lock lever 101 to push it down. Then, a recess 104 of the lock lever 101 is caught by a lock pin 105 which is fixed in place in the vicinity of the developing roller drive gear 96, as shown in FIG. 10. Consequently, the movement of the developing unit 59 in the vertical direction is restricted. Further, as shown in FIG. 10, a pin 106 and an opening 107 are provided for delimiting the rotatable range of the lock lever 101.

As described above, the force P is allowed to act on the developing roller 26 only in the vertical direction, and the up-down movement of the developing unit 59 is restricted by the lock lever 101. Such maintains the contact pressure acting between the developing roller 26 and the drum 11 stable while reducing oscillation of the developing roller 26 and, thereby, irregular rotation of the drum 11. Consequently, the jitter in the direction of rotation of the drum 11, i.e., in the subscanning direction is considerably reduced. It is to be noted that the rotation of the lock lever 101 due to the force of the spring 102 does not impair the manual operations for attaching and detaching the developing unit 59.

In the construction described above, while the previously discussed printing process is under way, the developing unit 59 is urged downward by the force of leaf spring 103. Such an implementation generally suffices, but it may be aided by the following arrangement in order to further ensure the elimination of jitter.

Specifically, the upper unit 1 is provided with a compression spring 108 in addition to leaf spring 103. When the upper unit 1 is closed, the lock lever 101 is urged by both the leaf spring 103 and the compression spring 108 until it is caught by the lock pin 105. Once the lock lever 101 is caught by the lock pin 105 as mentioned, a gap is developed between the lock lever 105 and the spring 108 to prevent the force of the spring 108 from reaching the lock lever 101. That is, the lock lever 101 is brought into engagement with the lock pin 105 only by the small force of the leaf spring 103. In this instance, assuming that the biasing force of the compression spring 108 is $P_1$ and that of the leaf spring 103 is $P_2$, should the force $P_1$ be excessively small, the lock lever 101 might fail to be rotated to a sufficient extent for complete locking, causing gear skipping and others. Conversely, should the force $P_2$ which is to be exerted during printing be excessively great, it might adversely affect the contact pressure between the drum 11 and the developing roller 26 to bring about omission of an image, jitter and other problems. For these reasons, the best combination of forces $P_1$ and $P_2$ has to be selected. In this particular embodiment, $P_1$ and $P_2$ are selected to be 2.0 kilograms and 300 grams, respectively.

Figure 37:
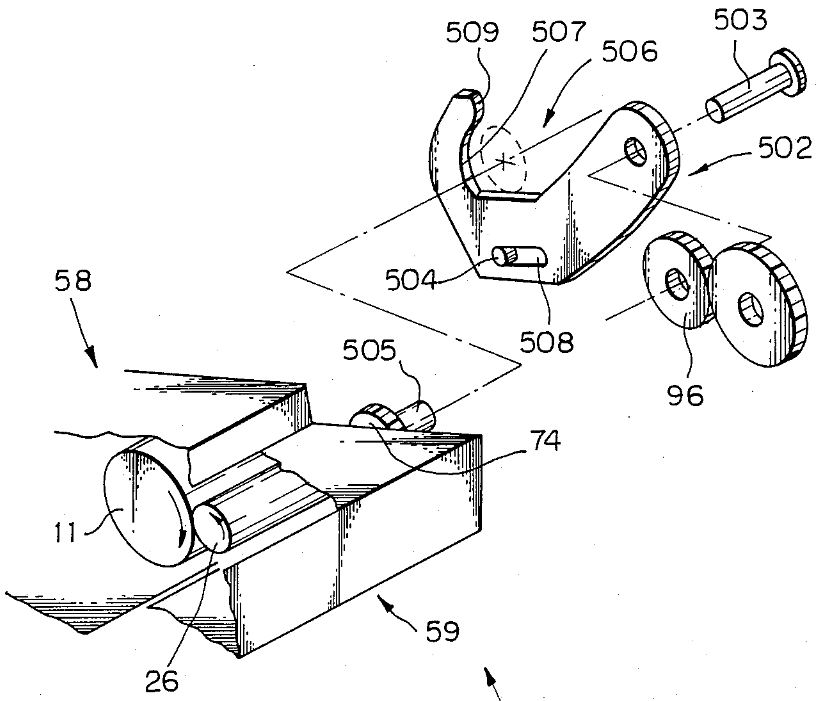
FIG. 37 is a perspective view showing a specific method of supporting the developing roller.

Referring to FIG. 37, a specific and preferred construction of a means for supporting the developing roller 26 is shown. As shown, a flat lock plate 502 is fixed in place by a shaft 503 of the developing roller drive gear 96 and a pin 504 which is fixed to the lower frame side plate 78*c*, FIG. 4. When the developing unit 59 is mounted in the unit case 60, FIG. 4, a shaft 505 of the developing roller 26 is received in a recess 506 of the lock plate 502 either directly or through a bearing, not shown.

Figure 38:
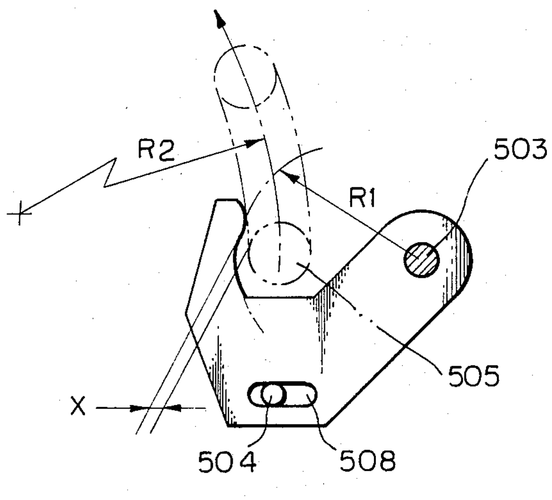
FIG. 38 is a front view of a lock plate.

As shown in FIG. 38, the lock plate 502 has a left inner end 507 (remote from the gear shaft 503) which is shaped in an arc (having a radius $R_1$) whose center is the axis of the gear shaft 503. A gap X is defined between the developing roller shaft 505 which is received in the recess 508 and the inner end 507 of the recess 506. The gap X may preferably be selected to be substantially 40% of the module of the gear 96.

In the above construction, the developing roller shaft 505 and, therefore, the developing roller 26 is prevented from moving away from the gear shaft 503 beyond the distance X. As the printing operation is repeated, the load acting on the developing roller is increased. The increased load causes a force to be imparted from the drive gear 96 to the gear 74 in a direction for urging the gear 74 away from the drive gear 96, whereby the developing roller is pressed against the drum 11. The developing roller 26 urged against the drum 11 by a greater force than necessary would lower the image quality.

In this particular embodiment, the arcuate inner end 507 of the lock plate 502 serves to limit the dislocation of the developing roller 26 toward the drum 11 to below the distance X, as described above. Hence the degradation of an image due to excessive force as mentioned above is eliminated.

In FIGS. 37 and 38, an opening 508 which is formed through the lock plate 502 for receiving the frame pin 504 should preferably comprise an elongate slot, so that the lock plate 502 may be free to move when the position of the drive gear 96 is adjusted.

Further, an upper portion 509 of the inner end which is contiguous with the arcuate end 507 should preferably be so shaped at its top as not to interfere with the roller shaft 505 when the developing roller 26 is removed from the lock plate 502.

In FIG. 3, compression springs 109 and 110 are provided on the inner surface of the right wall of the unit case 60, the spring 110 being located behind the spring 109 as viewed in the figure. As shown in FIG. 4(*b*), the springs 109 and 110 constantly bias opposite ends of the case 66 by forces $P_3$ and $P_4$, respectively. On the other hand, a compressing spring 111 is provided in that portion of the upper unit 1 which corresponds to the non-drive side (where the gear 74 is absent) of the developing unit 59. The spring 111 serves to urge the developing unit 59 downward by a force $P_5$ in a limited part of the non-drive side, when the upper unit 1 is closed.

In this manner, the developing unit 59 and, therefore, the developing roller 26 is horizontally urged toward the drum 11 at two spaced points, and the developing roller 26 is urged downward at a part of the non-drive side. This further ensures stable contact pressure between the drum 11 and the developing roller 26, thereby realizing a toner image having uniform density. It is to be noted that the forces $P_3$, $P_4$ and $P_5$ are individually selected depending upon the developing unit 59 and others used. In this particular embodiment, for example, the forces $P_3$, $P_4$ and $P_5$ are selected to be 700 grams, 100 grams and 1000 grams, respectively.

Figure 11:
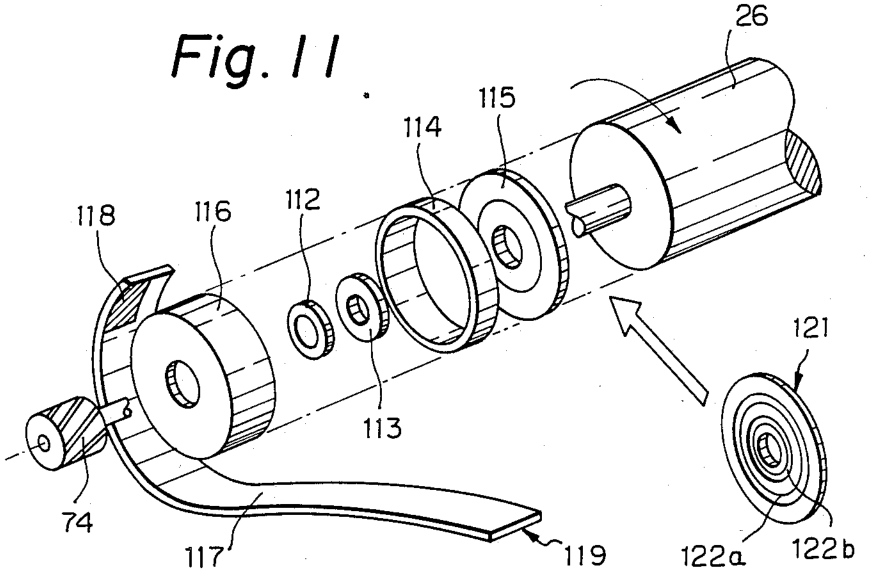
FIG. 11 is an exploded perspective view useful for explaining a sealing means which is associated with a developing roller.

As shown in FIG. 11, the gear 74 on the developing roller shaft is connected to the developing roller 26 through a bracket 116 which accommodates therein an oil seal 112, a retainer 113 (press-fitted), a cushion 114, a side seal 115, and others. While the printing process is under way, the developing roller 26 is rotated. In this condition, there is a fear of leakage of toner through between the bracket 116 and the developing roller 26. To prevent it, in this embodiment, a seal 117 which is implemented with a polyethylene film or like thin sheet is rigidly connected to the bracket 116 at one end thereof (indicated by hatching in the figure), then wrapped around while covering the joint between the bracket 116 and the developing roller, then drawn upward to an upper portion of the developing unit 59, and then rigidly connected thereto. Such a connection is accomplished by applying adhesive to hatched portion Q of the seal beforehand and, then, bonding it to the case 66 of the developing unit 59. To ensure firm adhesion, a plate 120 may be applied to the particular portion Q of the tape 117 and, then, pressed by the printer upper unit 1 with the end 119 of the tape 117 turned over to above the plate 120.

The seal 117 eliminates leakage of toner in the radial direction, as mentioned above. As regards leakage in the axial direction, it may be prevented by interposing a seal plate 121 between the side seal 115 and the developing roller 26. The seal plate 121 is provided with short projections 122*a* and 122*b* on both sides thereof which further improve the sealability attainable with the side seal 115.

In this embodiment, the casing of the charger 12 is molded integrally with the drum unit 58 by using resin. This advantageously cuts down the number of structural elements and the number of producing steps.

The resin used as mentioned above is generally electrically insulative. Enclosing the charge wire 13 by such an insulative material alone is problematic since the voltage at the start of discharge of the charge wire 13 would become so high as to cause current to leak in an unspecific direction prior to normal discharge toward drum 11. Further, even after the start of discharge, the charge would be unstable. While a prior art charger has solved this problem by using a casing made of a conductive material which is connected to ground, this embodiment of the present invention needs some compensatory measure since the casing is implemented with a single molding of resin.

In light of the above, as shown in FIGS. 3 and 4(*a*), the casing of the charger 12 is provided with an opening 296, and that part of the bottom upper unit 1 which corresponds to the opening 296 is provided with a ground plate 297 which is made of a conductive material to serve the same function as the prior art conductive casing. With this configuration, the charger 12 is free from leakage, unstable discharge, and other undesirable occurrences.

As shown in FIG. 2, the ground plate 297 is provided with a lug 297*a* on its front side (the control panel side). When the upper and lower units 1 and 2 are connected to each other, the lug 297*a* is received in an opening 298 which is provided in the drum unit 58. As indicated by a phantom line in FIG. 4, a conductive plate 299 which is connected to the shaft of the drum 11 is positioned in the opening 298. Hence, the lug 297*a* penetrated into the opening 298 is electrically connected to the shaft of the drum 11 via the conductive plate 299. Because the shaft of the drum 11 is usually connected to ground, the ground plate 297, too, is grounded.

Drive System

The drum 11 and developing roller 26 are driven by the main motor 92, as previously described with reference to FIG. 4. In this particular embodiment, however, the members which are driven by the main motor 92 are not limited to the drum 11 and roller 26.

Figure 18:
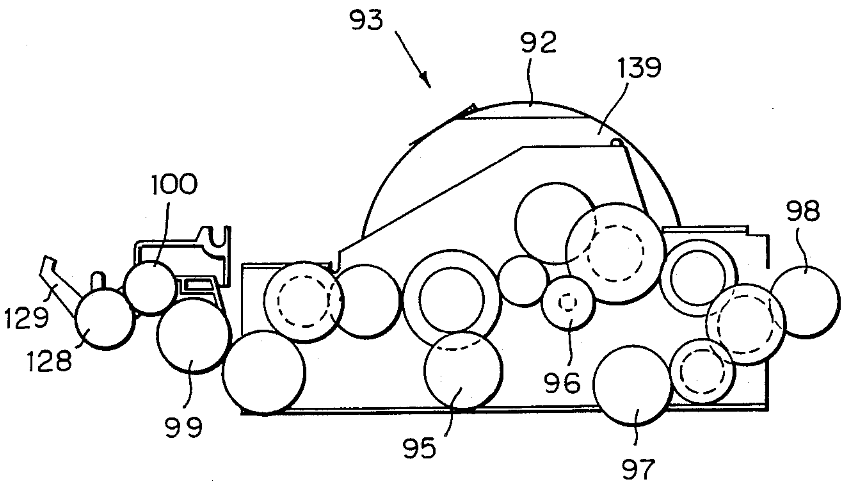
FIG. 18 is a front view of a drive system.

FIG. 18 shows in detail those gear trains which are driven by the main motor 92. As shown, the main motor 93 drives a transport roller drive gear 97, a feed roller drive gear 96, a heating roller drive gear 99, and a discharge roller drive gear 100, not to speak of the drum drive gear 95 and developing roller drive gear 96. The drive gear 97 is adapted to drive the lower transport roller 35 as shown in FIG. 3. The drive roller 98 serves to drive the feed roller 32, the drive gear 99 serves to drive the heating roller 36, and the drive gear 100 serves to drive the upper and lower discharge rollers 40 and 45.

The main motor unit 93 includes a main motor driver 139 in addition to the driver 92. Associated with the main motor 92 are a quartz oscillator for generating a reference signal which is adapted for constant-speed control, an encoder for indicating an actual motor speed which is also adapted for constant-speed control, a power circuit, a servo circuit for effecting constant-speed control, etc. The main motor driver 139 has such various devices which are mounted on a base plate and is fixedly mounted on the main motor 92. Such a unitary motor and motor driver structure is effective to minimize the number of parts for interconnecting the main motor 92 and the various devices and, thereby, to realize a compact main motor unit.

Ozone Discharging Device and Cooling Device

Generally, the discharge of the charger 12 and other chargers is accompanied with generation of ozone. Allowing ozone to stagnate in a limited location close to the drum 11 of the printer aggravates the deterioration of the drum. In addition, when the operator raises the upper unit 1, such ozone would cause the operator to feel uneasy. In this embodiment, those undesirable occurrences which are ascribable to ozone are eliminated by installing an ozone discharging device as will be described.

As shown in FIG. 3, a fan 46 for blowing ozone is located above the charger 12. As shown in detail in FIG. 13, the fan 46 is fixed in place in a substantially central part of the upper unit frame 47, which is made of resin, in such a manner as to extend rearward from a front wall 47*a* of the frame 47. That part of the frame 47 to which the fan 46 is fixed is provided with a plurality of openings 48. In this construction, as the fan 46 is rotated, air sucked through the openings 48 is fed to the vicinity of the drum 11 and uniformly along the axis of the drum 11. Such streams of air blow ozone which may stagnate around the drum 11 to deteriorate it. The fan 46 begins to rotate at the same time as the drum 11 at latest since, generally, the rotation of the drum 11 and the turn-on of the charger 12 which is the source of ozone production are synchronized to each other. The timing for stopping the rotation of the fan 46 is selected to be 8 to 10 seconds later than the timing at which the drum is to be stopped since, although the discharge of the charger 12 ends timed to the stop of rotation of the drum 11, stopping the fan 46 simultaneously with the stop of the drum 11 would prevent the fan 46 from sufficiently blowing the ozone stagnating around the drum 11. It is to be noted, however, that the period of time of 8 to 10 seconds mentioned above applies only to the structure in accordance with this embodiment and may be suitably varied when a different structure from the embodiment is used.

In FIG. 3, a suction fan unit 49 is located at the left-hand side of the fan 46. As shown in detail in FIG. 15, the suction fan unit 49 includes a fan 50 and an ozone filter 52 which is supported by a holder 51 which is in turn fixed to a casing of the fan 50. As the fan 50 is rotated, the ozone-containing air which has been blown by the fan 46 is sucked by the fan 50 and dissipated to the outside of the printer through the ozone filter 52. Hence, no ozone is allowed to stagnate in the printer and, yet, ozone is trapped by the ozone filter 52 before reaching the atmosphere.

Figure 16:
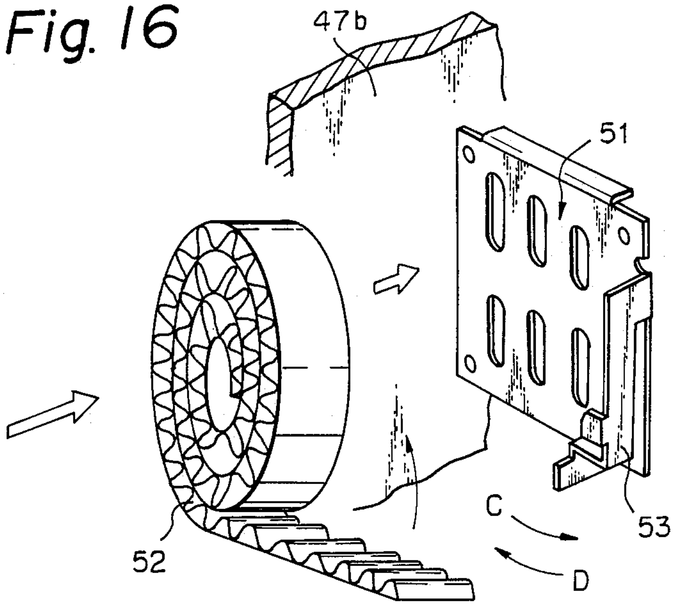
FIG. 16 is a fragmentary exploded perspective view of the fan unit.

As shown in FIG. 16, the filter holder 51 is formed of a thin metallic material and provided with a holding piece 53 at its one side edge. The filter 52 is produced by winding a corrugated paper tape in a spiral and, then, adhering the outermost part by use of an adhesive tape. The corrugated paper is impregnated with carbon. The holding piece 53 of the holder 51 may be manually moved outward as indicated by the arrow C; when the holding piece 53 is released, it is resiliently restored to its original position as indicated by an arrow D. To fit the filter 52 to the holder 51, the holding piece 53 is manually forced outward, then the filter 52 is pressed against the holder 51, and then the holding piece 53 is released to return it in the direction D. In this condition, the filter 52 is fixed in place by the holding piece 53 and a part 47*b* of the frame 47. This eliminates the need for a special tool and, thereby, cuts down on the cost, while allowing the filter 52 to be attached and detached with ease.

Figure 12:
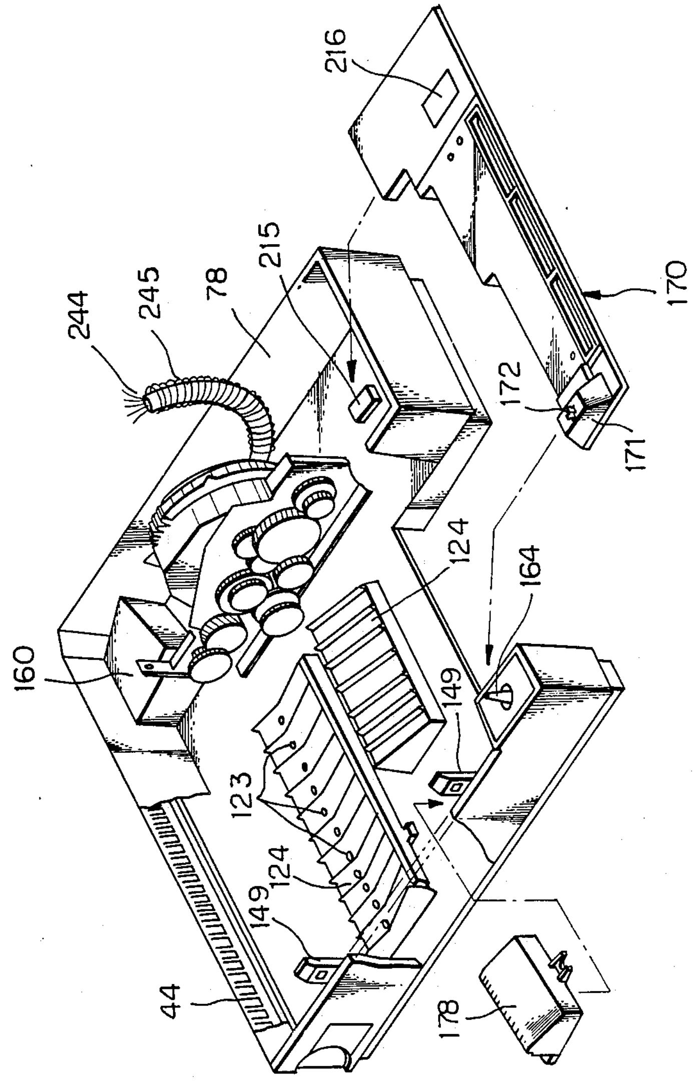
FIG. 12 is a fragmentary exploded perspective view of a lower unit of the printer.
Figure 13:
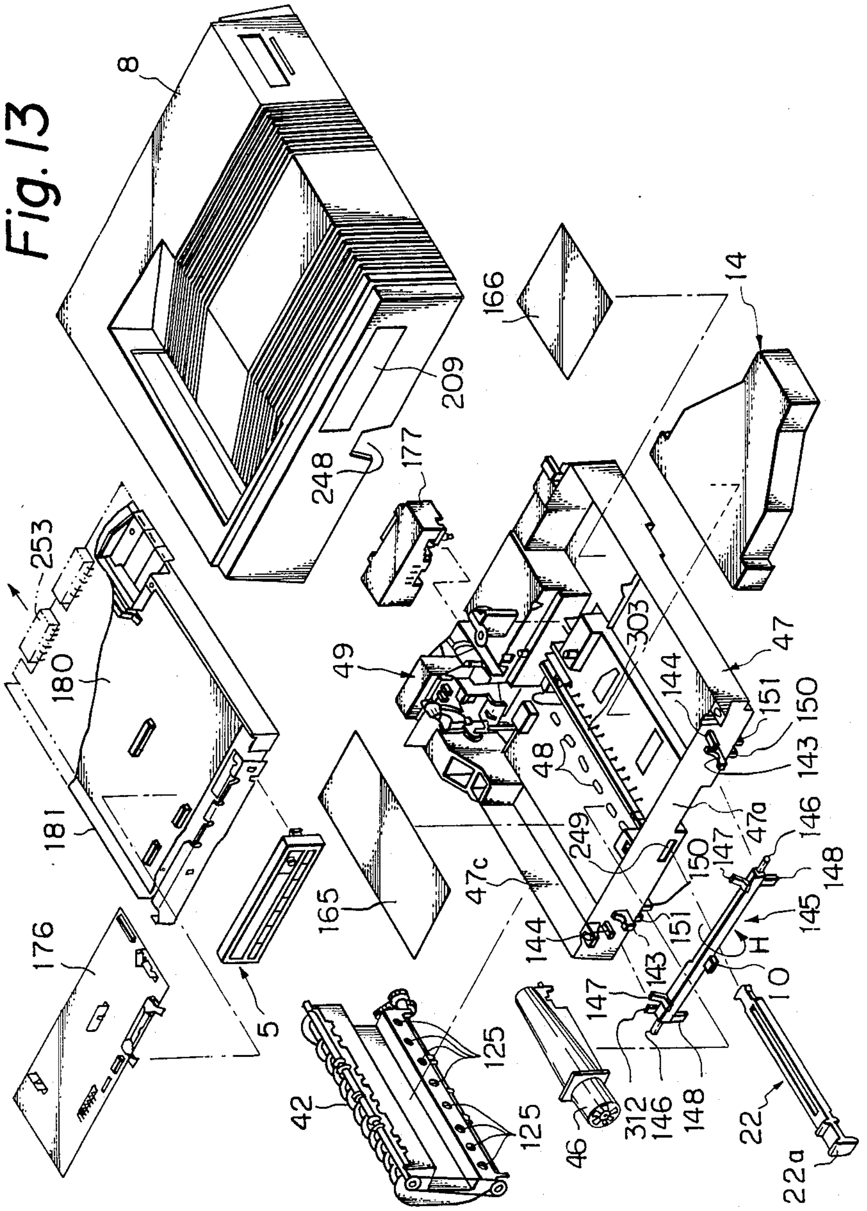
FIG. 13 is a fragmentary exploded perspective view of an upper unit of the printer.
Figure 14:
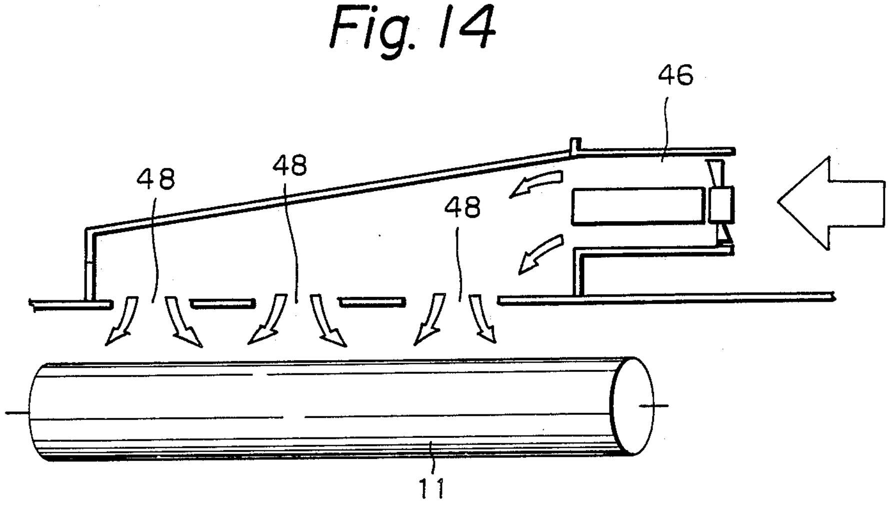
FIG. 14 is a fragmentary front view of an ozone discharging device.

As shown in FIG. 12, a transport rib member 124 which is associated with the lower frame 78 is provided with numerous perforations 123, which will be described in detail later. As shown in FIG. 13, the discharge guide member 42, too, is provided with numerous perforations 125 in its lower portion. As the previously stated fan 50 is rotated, fresh air flows through the perforations 123 and 125 toward the fixing roller 36 and other fixing devices as well as toward the tank 57 for toner collection and, then, out of the printer through the fan 50. This effectively cools off the fixing devices and tank 57. Cooling the fixing devices is effected to prevent the fixing devices and various other devices surrounding them from being heated to an excessive degree. On the other hand, cooling the tank 57 is effected to prevent toner inside the tank 57 from melting due to heat and sticking.

In FIG. 3, it is preferable that an adequate space is left between the image-forming unit case 60 and the fixing devices in order to enhance the cooling effect. Specifically, air flowing through such a space would promote effective cooling. The fan 50 another function of which is cooling the fixing devices as stated above is constantly rotated, in contrast to the ozone blowing fan 46.

Printer Case and Sheet Transporting System

The various devices of the printer are enclosed in the cover 8 and lower frame 78 each of which is implemented with a molding of the synthetic resin containing 10 to 20% of glass fibers. Particularly, as shown in FIG. 12, the lower frame 78 is provided with a number of ribs 124 which define the sheet transport path (see FIG. 3) and each extends along the intended direction of sheet transport. These ribs 124, too, are molded integrally. Among the ribs 124, those which are located below the toner collecting tank 57 are also provided with the previously stated numerous perforations 123. In FIG. 3, the discharge guide plate 44, too, is molded integrally with the lower frame 78.

As shown in FIG. 13, the discharge guide plate 42 is fixed to a side wall 47*c* of the upper unit frame 47. The discharge guide plate 42, too, is implemented with a molding of synthetic resin and provided with the numerous perforations 125 in its lower portion.

The discharge guide plate 43 shown in FIG. 3 is formed integrally with the top cover 8.

Figure 17:
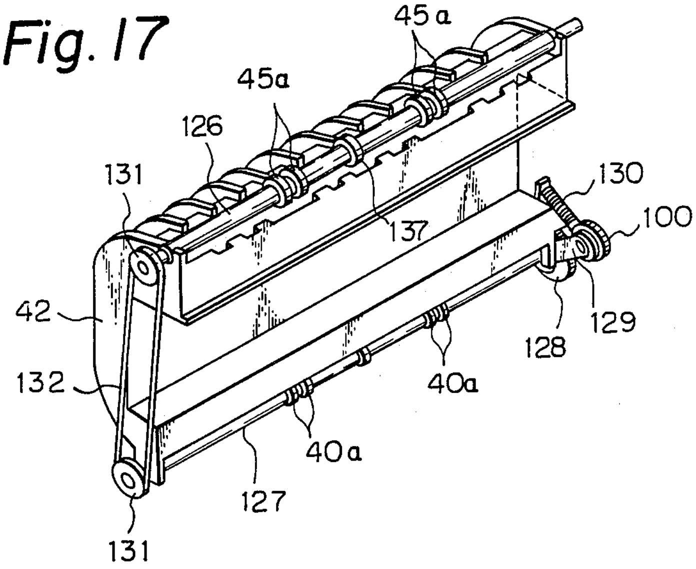
FIG. 17 is a perspective view of a sheet discharge guide member.

As shown in FIG. 17, among the upper and lower discharge rollers 45 and 40, drive rollers 45*a* and 40*a* are provided in a form of rubber rings which are fitted on, respectively, roller shafts 126 and 127 which are in turn detachably and rotatably supported by an upper and a lower portion of the discharge guide member 42. A gear 128 is rigidly mounted on one end of the lower roller shaft 127 and held in mesh with the discharge roller drive gear 100, FIG. 18. The drive gear 100 is supported by an arm 129 which is rotatably mounted in the lower roller shaft 127. A compression spring 130 is anchored to the arm 129.

The discharge guide member 42 is mounted on the upper unit frame 47, FIG. 13, of the upper unit 1, as mentioned earlier. When the printer upper unit 1 is closed with the discharge guide member 42 mounted, the discharge roller drive gear 100 is brought into mesh with the heating roller drive gear 99 of FIG. 18. At this instant, the spring 130 is compressed by a predetermined amount to apply a force to between the gears 100 and 99 which is necessary for the transmission of a driving force. In this condition, as the main motor 92 is rotated, it rotates the lower roller shaft 127 and, thereby, the drive roller 40*a*. Because lower roller shaft 127 and the upper roller shaft 126 are drivably connected together by pulleys 131 and a belt 132 which is passed over the pulleys 131, the upper drive roller 45*a* is caused to rotate timed to the rotation of the lower drive roller 40*a*.

Figure 19:
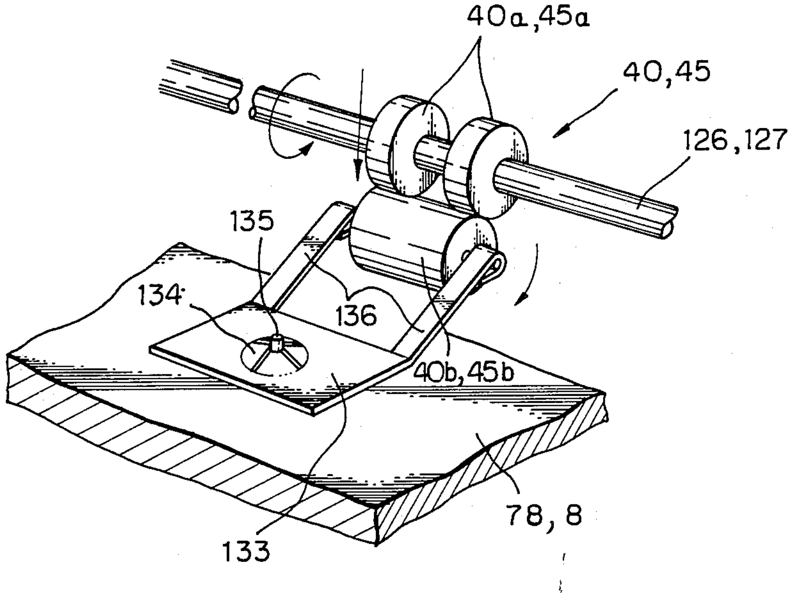
FIG. 19 is a perspective view of discharge roller.

As shown in FIG. 3, the discharge drive rollers 40*a* and 45*a* are held in pressing contact with the driven rollers 40*b* and 45*b*, respectively. In this particular embodiment, as shown in FIG. 19, the drive rollers 40*b* and 45*b* are fixed to the lower frame 78 or the cover 8 by a holder 133 which is made of a spring material. When the drive rollers 40*a* and 45*a* are pressed against, respectively, the driven rollers 40*b* and 45*b*, arms 136 of the holder 133 is deformed to produce a biasing force which is necessary for driving a paper sheet.

The holder 133 includes a slotted fixing portion 134 which is press-fitted to a pin 135 that extends from the lower frame 78 or the cover 8. The holder 133, therefore, is fixed to the lower frame 78 or the like without resorting to screws and others. The driven rollers 40*b* and 45*b* are supported with their support shafts inserted in bent portions which are provided at the free ends of the arms 136 of their associated holders 133.

The upper and lower roller shafts 126 and 127 should preferably be made of non-conductive synthetic resin so as to omit grounding. Also, it is preferable that those portions of the shafts where the rubber rings, or discharge rollers 40*a* and 45*a* are located, be stepped relative to the rest in order to prevent those rubber rings from being dislocated.

Figure 20:
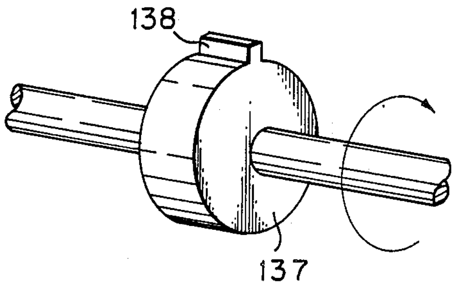
FIG. 20 is a perspective view of a ring adapted for the discharge of a transfer material.

In FIG. 17, a ring 137 is lightly press-fitted on the upper roller shaft 126 at substantially the intermediate between the opposite ends of the latter. As shown in FIG. 20, the ring 137 has a short lug 138 on its periphery which is adapted to force the rear end of a paper sheet, which is to be routed to the discharge tray 9, thereby promoting efficient stacking of the next paper sheet.

Figure 21:
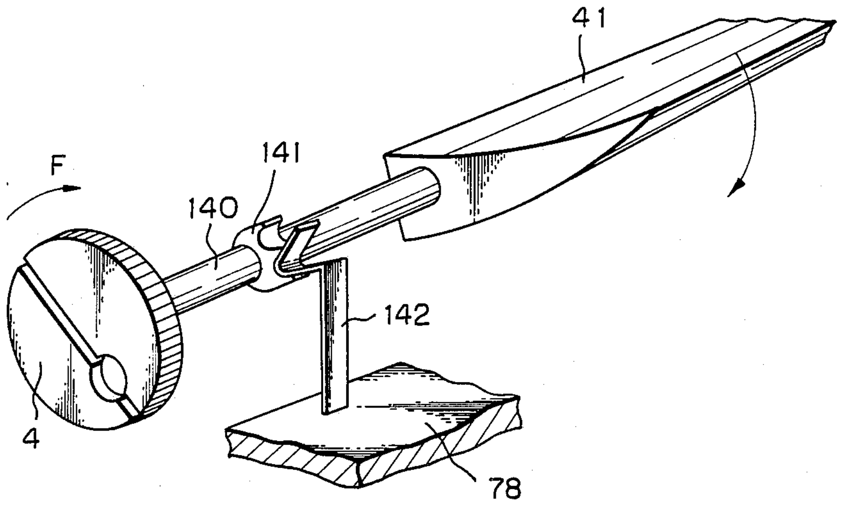
FIG. 21 is a perspective view of a discharge path switching means.

The selector pawl 41, FIG. 3, and the discharge switching knob 4, FIG. 2, are related as follows. As shown in FIG. 21, the selector pawl 41 and the switching knob 4 are connected to each other by a shaft 140. A cam 141 having two recesses is mounted on the shaft 140 within the lower frame 78. The recesses of the cam 141 are alternatively mated with a projection of a lock member 142 which is made of a spring material and fixed to the lower frame 78. While the cam 141 is engaged with the lock member 142 as stated, the angular movement of the cam 141 and, therefore, that of the selector pawl 41 is restricted.

When the knob 4 is manually rotated as indicated by an arrow F from the position of FIG. 21, the lock member 142 is once forced to yield and, when the upper recess of the cam 141 is brought to the projection of the lock member 142, the lock member 142 and the cam 141 are mated again to be locked in place. The upper and lower recesses of the cam 141 correspond to, respectively, the solid line and phantom line positions of the selector pawl 41 as shown in FIG. 3. The size (e.g. radius of curvature) of each recess of the cam 141 should preferably be smaller than that of the projection of the lock member 142 in order to promote sure locking.

The upper unit 1 is rotatable away from the lower unit 2, as already stated. Specifically, as shown in FIG.

28, a hinge pin 238 is fixed to the lower frame 78 of the lower unit 2. The upper unit frame 47 of the upper unit 1 is rotatable up and down about the hinge pin 238. Among the cases wherein raising the upper unit 1 is necessary, there are some cases wherein it does not have to be raised over a large angle such as when a jamming sheet is to be removed and when simple maintenance work is to be performed. Considering such cases, it would be convenient to dispose a stop pin 246 in the lower frame 78 at the right-hand side of the hinge pin 238 as viewed in the figure. In this configuration, when a bracket 247 of the upper frame 47 abuts against the stop pin 246, any further rotation of the upper frame 47 is inhibited.

It would be further convenient to make the stop pin 246 detachable from the lower frame 78. Specifically, if the stop pin 246 is detachable, when it is necessary to raise the upper unit 1 over a large angle such as for the replacement of the drum unit 58 and developing unit 59, the stop pin 246 can be removed from the lower frame 78 to allow the upper frame 47 to be raised to a substantially vertical position, as indicated by a phantom line in the figure.

The two-step rotation structure of the upper frame 1 as stated above would afford convenience to the operator.

Upper and Lower Units Locking Mechanism

When the printer unit 1 is lowered from the open position of FIG. 1 as indicated by an arrow C, it assumes the position of FIG. 3 to become prepared for printing. In practice, however, it is necessary to lock the upper and lower units 1 and 2 in such a position. Hereinafter will be described a mechanism for meeting this requirement.

Referring to FIG. 13, two lever support brackets 143 and two lever presser plates 144 are provided on the front end 47*a* of the upper unit frame 47 and molded integrally therewith by using resin. Each of the lever support brackets 143 is adapted to support a respective one of shafts 146 which extend out from opposite ends of a lock lever 145. At this instant, the shafts 146 are pressed down by their associated presser plates 144. Because the presser plates 144 are made of resin and flexible, the shafts 146 are inserted in the bracket 143 by forcing the presser plates 144 upward. As soon as the shaft 146 are individually received in their associated brackets 143, the pressure plates 144 are automatically returned downward to firmly retain the entire lock lever 145. To promote the ease of mounting the lock lever 145 to the upper unit frame 47, each shaft 146 may be slotted along its axis.

While the lock lever 145 is rotatable around the shafts 146, it is constantly biased for rotation as indicated by an arrow H by two spring members 147 which extend toward the frame 47 from an upper portion of the lock lever 145. The spring members 147 may be implemented with leaf springs or may be molded integrally with the lock lever 145 by using elastic resin.

Two lock pawls 148 are also molded integrally with the lock lever 145 to extend from the opposite sides of the lower end of the latter. As shown in FIG. 12, two hooks 149 are molded integrally with the lower frame 78 in positions corresponding to those of the lock pawls 148. When the upper unit 1 is closed, the lock pawls 148 of the lock lever 145 are automatically mated with hooks 149 due to the action of the spring members 147, thereby locking the upper unit 1 to the lower unit 2. To raise the upper unit 1, the operator holds the lock lever knob 10 and rotates it upward against the action of the spring members 147. This relaxes the lock pawls 148 and the hooks 149 from each other to allow the operator to raise the upper unit 1 without any trouble. The lock lever knob 10 protrudes to the outside through an opening 248 which is formed in the front end of the cover 8.

Heretofore, such a locking mechanism has customarily been implemented with a composite structure in which knobs, pawls and others are provided on metal shafts. In contrast, in this embodiment, use is made of mouldings of resin which are light weight, easy to produce, and do not need grounding. A stop 312 is molded integrally with the lock lever 145 and projected toward the case 47 like the spring members 147. The stop 312 functions to limit the rotation of the lock lever 145 to a predetermined amount to thereby prevent the spring members 147 from losing resiliency due to excessive rotation of the lock lever 145.

Figure 22:
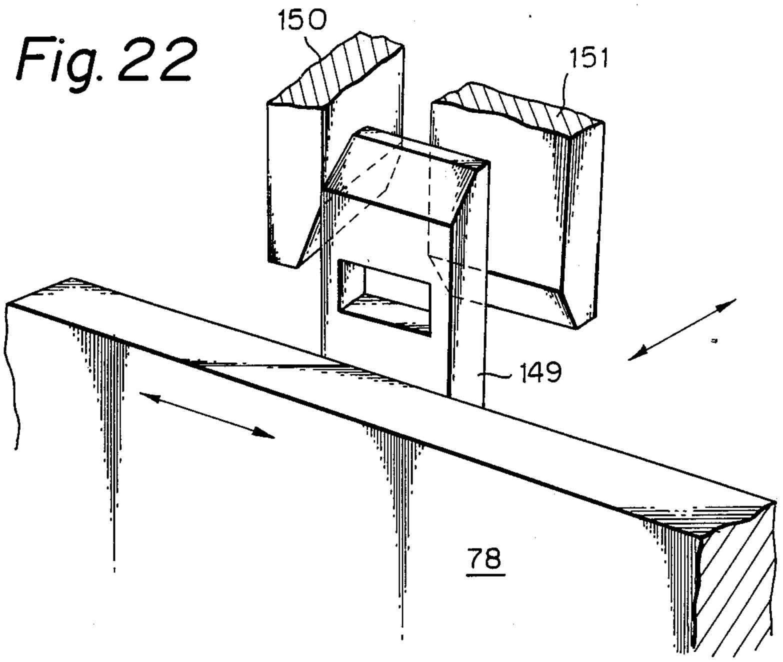
FIG. 22 is a fragmentary perspective view of an upper unit positioning means.

Further, two positioning lugs 150 associated with the sheet transport direction and two positioning lugs 151 associated with the axial direction of the drum 11 are disposed below the respective support brackets 143 and molded integrally with the frame 47. Among those paired lugs, the pair on the right-hand side as viewed in FIG. 13 is engaged with the hook 149 which is also positioned on the right-hand side as viewed in FIG. 12, as shown in an enlarged view in FIG. 22. The paired lugs 150 and 151 which are engaged with the single hook 149 surely prevent the upper unit frame 47 from being dislocated in the axial direction of the drum 11 (main scanning direction of laser) and the sheet transport direction (subscanning direction of laser).

Laser Optical Device

As regards the laser optical device 14, FIG. 13, an example thereof has been outlined with reference to FIGS. 5 and 6. In the example shown and described, the first and third mirrors 19 and 23 have to be accurately fixed in a vertical position each in order to maintain the optical path in a normal condition.

Figure 23:
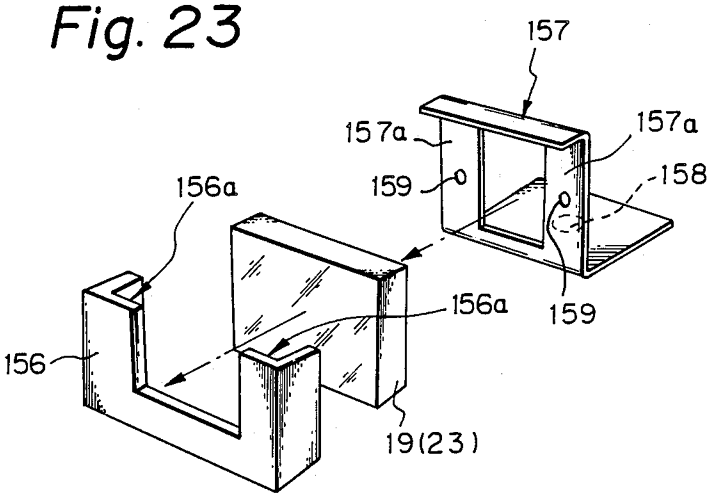
FIG. 23 is a perspective view of a mirror fixing means which is included in the laser optical device.

As shown in FIG. 23, in this particular embodiment, the first mirror 19 and others are fixed in place by a support 156 which is formed integrally with a case 155, FIG. 5, and a pressure plate 157 which is made of spring material. That surface 156*a* of the support 156 against which the first mirror 19 is pressed is accurately finished vertically. After the mirror 19 has been applied to the vertical surface 156*a*, it is pressed against the vertical surface 156*a* from the back by two arms 157*a* of the presser plate 157. The arms 157*a* are configured such that they urge the mirror 19 by flexural deformation when the presser plate 157 is fastened by a screw to a predetermined position of the case 155 through an opening 158. Each of the arms 157*a* is provided with a short lug 159 which extends toward the mirror 19 so that the mirror 19 is pressed against the vertical support surface 156*a* at two spaced points which are defined by the lugs 159. By such two-point abutment, the mirror 19 is surely positioned on the vertical support surface 156*a*.

A specific configuration of the second cylindrical lens 22 which is roughly shown in FIGS. 3 and 6 is shown in a lower part of FIG. 13. The cylindrical lens 22 is molded integrally with a lens portion by using resin. The cylindrical lens 22 may be inserted in and removed from a predetermined position inside of the upper unit frame 47, FIG. 3, through an opening 249 which is formed through the front wall 47*a* of the frame 47. When inserted in the predetermined position, the cylindrical lens 22 plays two different roles at the same time, i.e., the role of an optical lens and that of a seal member for keeping the interior of the optical device from toner, dust and other particles. Hence, it is desirable that the cylindrical lens 22 and that part of the upper unit frame 47 which corresponds to the lens 22 are coupled together as air-tight as possible.

The cylindrical lens 22 is provided with a thumb piece 22*a* which may be held during the insertion and removal of the lens 22. The thumb piece 22*a*, like that 10 of the lock lever 145, is exposed to the outside through the opening 248 of the cover 8 when the cylindrical lens 22 is placed in the predetermined position. Such common use of the opening 248 is desirable from the viewpoint of appearance and operability.

Figure 33:
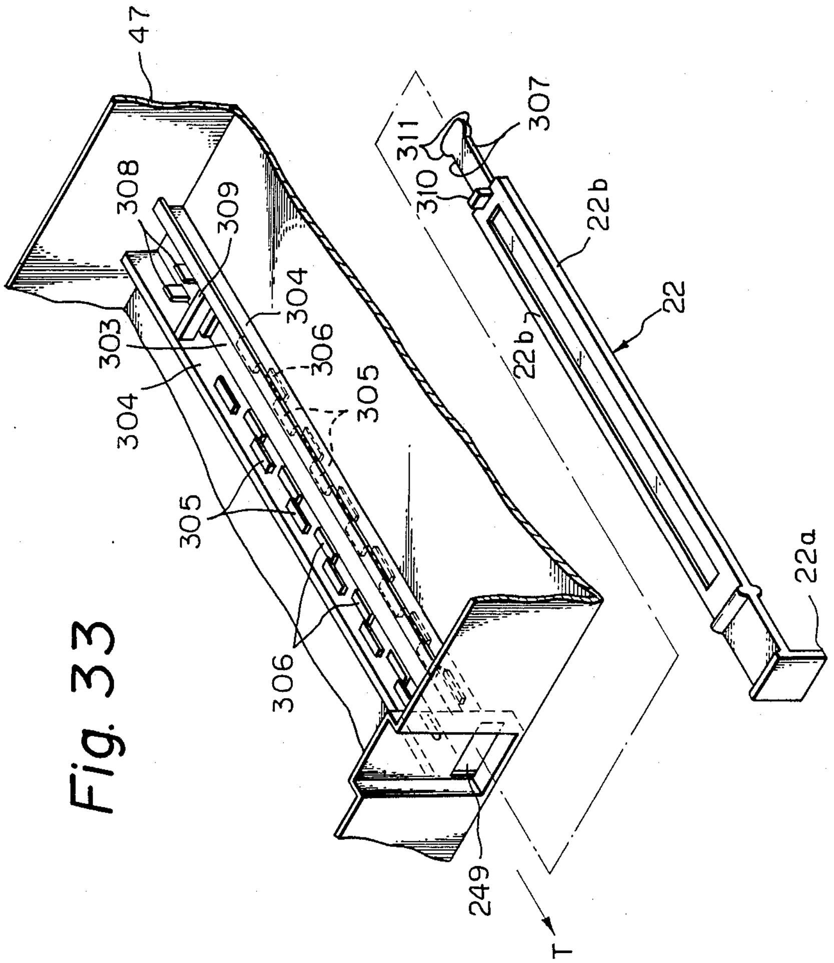
FIG. 33 is a perspective view showing a specific construction of a means for supporting a second cylindrical lens.

FIG. 33 shows a specific arrangement of a means for mounting the second cylindrical lens 22. As shown, the cylindrical lens 22 is disposed in a channel 303 which is defined in the upper unit frame 47 by two parallel walls 304 which are molded integrally with the upper unit frame 47. Upper support portions 305 and lower support portions 306 are arranged on each of the facing surfaces of the walls 304 for guiding opposite side edges 22*b* of the cylindrical lens 22 which extend in the lengthwise direction of the lens 22. The support portions 305 and 306 are molded integrally with the upper unit frame 47. In this configuration, the cylindrical lens 22 is supported by the upper unit frame 47 with its edges 22*b* held between support portions 305 and 306.

It should be noted that the staggered arrangement of the upper and lower support portions 305 and 306 on the side walls is merely to facilitate removal from a mold in the event of molding of the upper unit frame 47. If desired and practicable, the support portions 305 and 306 may be replaced with parallel guide rails or the like.

Figure 34:
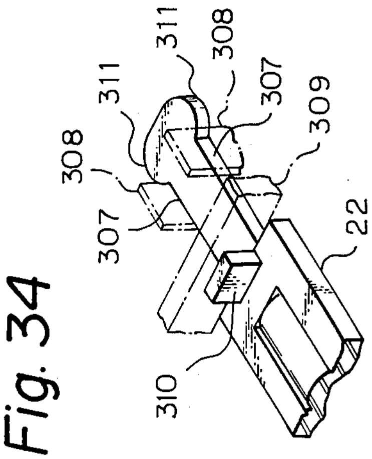
FIG. 34 is a perspective view showing hop the tip of the second cylindrical lens is mounted.

As shown in FIG. 34, when the second cylindrical lens 22 is loaded, locking portions 307 provided at the tip of the cylindrical lens 22 are individually engaged with elastic pieces 308 which are molded integrally with the upper unit frame 47. In this condition, the cylindrical lens 22 is prevented from slipping off the channel 303. Further, a piece 310 which extends out from the cylindrical lens abuts against a stop 309 which is laid across the channel 303 and molded integrally with the parallel walls 304, whereby the cylindrical lens 22 is prevented from inserted deeper beyond the predetermined position.

The second cylindrical lens 22 may be pulled out for cleaning or replacing it by holding the thumb piece 22*a* and, then, pulling it as indicated by an arrow T. Specifically, as the operator pulls out the lens 22, an enlarged portion 311 which is provided at the tip of the lens 22 elastically urges the elastic pieces 308 away from each other to release the locking portions 307 from the elastic pieces 308.

As shown in FIG. 3, a beam shutter 258 is located at the right of the ozone fan 46 to be rotatable about a pin 259. When the upper and lower units 1 and 2 are closed as shown in FIG. 3, the beam shutter 258 is rotated upward by a lug 250, FIG. 4(*a*), which stands upright on the drum unit 58. In this condition, an elongate slot 251 for laser beam is left open. As the upper unit is raised, the beam shutter 258 is released from the lug 250 and rotated to the right to close the slot 251.

In this embodiment, an interlock switch 4 which will be described is used so that when the upper unit 1 is raised, current application to the laser optical device 14 is interrupted to prevent the latter from emitting a laser beam. The beam shutter 258 mentioned above is provided against possible malfunctions of the interlock switch 4.

Further, a shield member 252 made of rubber, sponge or like elastic material is rigidly connected to that part of the upper unit frame 47 to surround the laser beam slot 251 (see FIG. 2). When the upper and lower units 1 and 2 are closed, the bottom of the shield member 252 abuts against the top of the developing unit 58 which is mounted in the lower unit 2, as shown in FIG. 3. In this condition, the shield member 252 hermetically isolates the laser beam slot 251 from the neighborhood to thereby prevent toner, dust and others from entering the laser optical device 14 while eliminating leakage of laser beam as well as penetration of ambient light.

Sheet Feed and Discharge Sections

The feed tray 3 is detachably mounted to the lower unit 2. The general configuration of the feed tray 3 has already been described. A manual insertion guide plate 255 is positioned in an upper portion of the feed tray 3 to allow a transfer material to be inserted by hand (arrow M in FIG. 3). For example, assuming that ordinary paper sheets are stacked on the feed tray 3 and envelopes are to be manually fed along the manual guide plate 255, letters and envelopes may be prepared alternately and in pairs.

Figure 30:
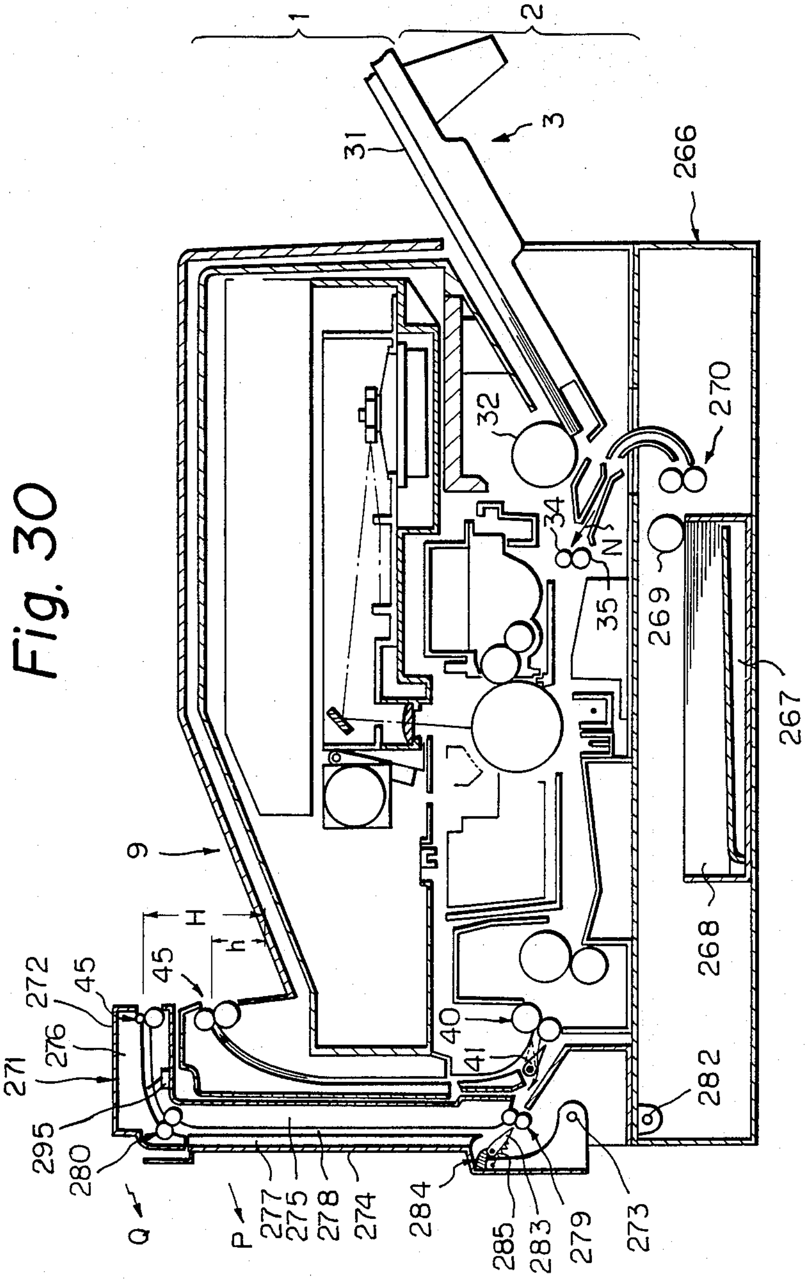
FIG. 30 is a sectional side elevation of the printer with an optional sheet discharge unit mounted thereon.

As shown in FIG. 30, a feed unit 266 may be detachably connected to the bottom of lower unit 2 as desired. The feed unit 266 accommodates an auxiliary feed tray 267 on which a stack of paper sheets 268 are loaded. The paper sheets 268 are fed one by one into the lower unit 2 by a feed roller 269 and transport rollers 279 as indicated by arrow N. In the lower unit 2, the paper sheets 268 sequentially undergo the printing process as has been described in relation to the paper sheets 31 stacked on the feed tray 3.

One of the feed trays 3 and 267 is selected in response to a command which may be entered through switches provided on the control panel 5 or fed from a host computer.

As shown in FIG. 30, the distance of transport between the auxiliary feed tray 267 and the upper and lower transport rollers 34 and 35 is longer than that between the feed tray 3 and the transport rollers 34 and 35. However, the printing process cannot be executed unless the period of time for the paper sheet 268 from the tray 267 to reach the transport rollers 34 and 35 is equal to that for the paper sheet 31 from the tray 3 to reach the same. To meet this requirement, the feed roller 269 associated with the tray 267 are driven to feed the paper sheet 268 at a higher rate than the feed roller 32 which is associated with the tray 31.

The paper sheets undergone the printing process are sequentially stacked on the discharge tray 9. The number of paper sheets which can be stacked on the discharge tray 9 increases as the tray 9 becomes deeper, i.e., as the height h as measured from the tray 9 to the discharge roller 45 increases. However, an excessively deep discharge tray would put the stack out of order and add to the overall dimensions of the printer.

In the case where use is made of the auxiliary feed tray 267 as mentioned above, there is a fear that the number of paper sheets to be stacked on the discharge tray 9 increases sharply. In the light of this, it is preferable to adopt the following construction.

As shown in FIG. 30, a discharge unit 271 is disposed at the left of upper and lower units 1 and 2. The discharge unit 271 includes a case 272, and a cover 274 which is supported by the case 272 through a pin 273 to be rotatable as indicated by an arrow P. The cover 274 is usually held in a vertical position as shown in FIG. 3 by a locking device, not shown. The cover 274 and case 272 are provided with a plurality of ribs 275, 276 and 277 which are individually arranged at spaced locations in a direction perpendicular to the sheet surface of FIG. 30. The ribs 275, 276 and 277 define a discharge path 278. Transport rollers 279 and 280 and a discharge roller 281 are supported by the case 272 so as to transport and discharge paper sheets.

When it is desired to discharge paper sheets through the discharge unit 271, the previously mentioned selector pawl 41 is switched to the phantom line position. Then, a paper sheet driven by the discharge rollers 40 will be routed through the transport rollers 279 into the discharge unit 271.

The height H as measured from the discharge tray 9 to the discharge roller 281 of the discharge unit 272 is greater than the height h. Therefore, when paper sheets are to be discharged through the discharge unit 271, a larger number of paper sheets can be stacked on the discharge tray 9. In such a case, paper sheets coming out of the discharge unit 271 should preferably be prevented from falling deep to become out of order. This may be accomplished by discharging paper sheets by use of the discharge roller 45 until they have been stacked to the height of the discharge roller 45 and, then, discharging the following paper sheets by use of the discharge roller 281.

If desired, the discharge roller 281 and the discharge roller 45 may be used independently of each other or alternately.

The printer upper unit 1 is rotatable upward away from the lower unit 2. However, while the upper portion of the discharge unit 271 is located above the upper unit 1 as shown in FIG. 30, it interferes with the upward movement of the upper unit 1. In this embodiment, therefore, the discharge unit 271 is connected to the feed unit 266 (or the lower unit 2) by a pin 282 to be rotatable as indicated by the arrow Q. Specifically, when the discharge unit 271 is rotated in the direction Q relative to the upper and lower units 1 and 2, the upper unit 1 can be opened or closed without any interference. Alternatively, the discharge unit 271 may be detachably mounted to the feed unit 266 or the like so as to be removable when the upper unit 1 is opened or closed.

Figure 31:
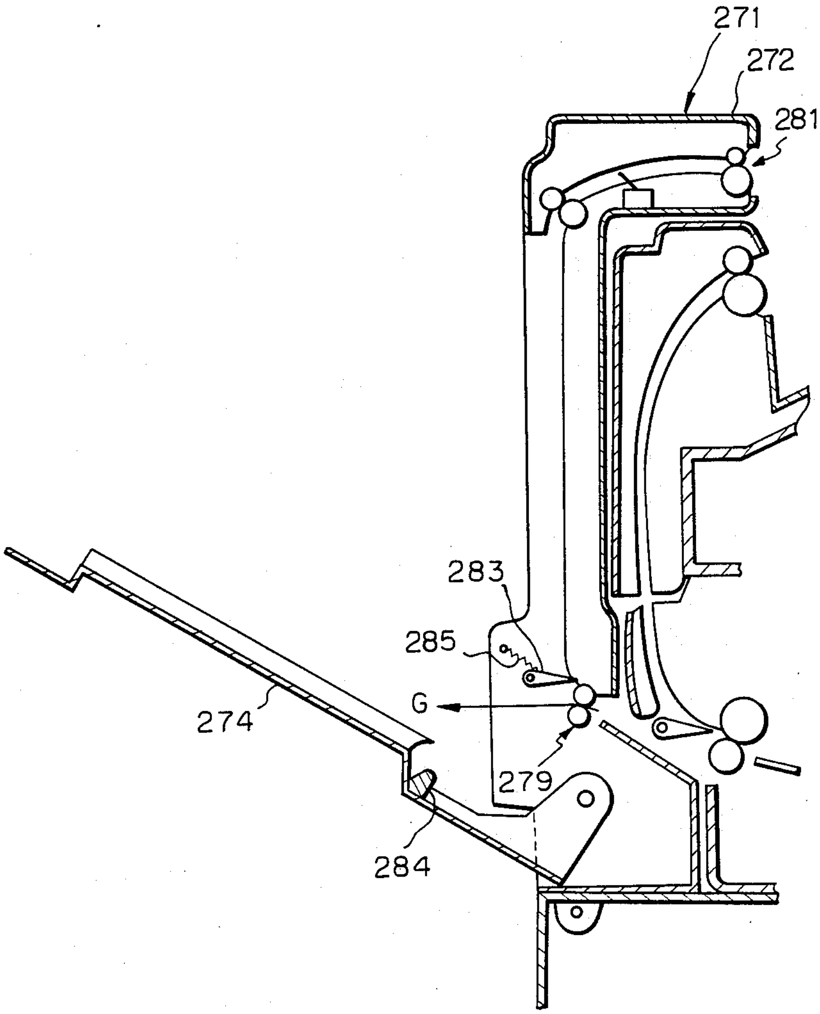
FIG. 31 is a sectional side elevation of the optional sheet discharge unit.

Even if a sheet jams the discharge path 278 which is defined in the discharge unit 271, it can be easily removed by rotating the cover 274 about the pin 273 to the position shown in FIG. 31. In the position of FIG. 31, the discharge path 278 is exposed to the outside for easy access.

An auxiliary selector pawl 283 is located next to the lower transport rollers 279 and moveable between a position shown in FIG. 30 and a position shown in FIG. 31. In the position of FIG. 30, the selector pawl 283 directs paper sheets toward the previously stated discharge tray 9. In the position of FIG. 31, it directs paper sheets toward the cover 274; this kind of discharge mode may be adopted when discharging papers face down is not desired. The cover 274 which itself plays the role of a tray contributes to the cut-down of the number of parts.

In a preferred arrangement, the auxiliary selector pawl 283 is switchingly moved between the two positions interlocked with the cover 274. Specifically, a switch, not shown, which turns on and off in response to opening and closing of the cover 274 is provided. When the cover 274 is opened as shown in FIG. 31, the switch is turned on to operate a motor, a solenoid or like driver to thereby move the selector pawl 283 from the position of FIG. 30 to that of FIG. 31. Conversely, when the cover 274 is closed, the switch is turned off so that the selector pawl 283 is returned to the position of FIG. 30.

In another preferred arrangement, the cover 274 is provided with a cam member, as shown in FIGS. 30 and 31. While the cover 274 is closed, the selector pawl 283 is conditioned as shown in FIG. 30 by a toggle spring 285. When the cover 274 is opened, the cam member 284 mounted on the cover 274 abuts against the selector pawl 283 to urge it to the position of FIG. 31, the selector pawl being maintained in that position by the toggle spring 285.

Figure 32:
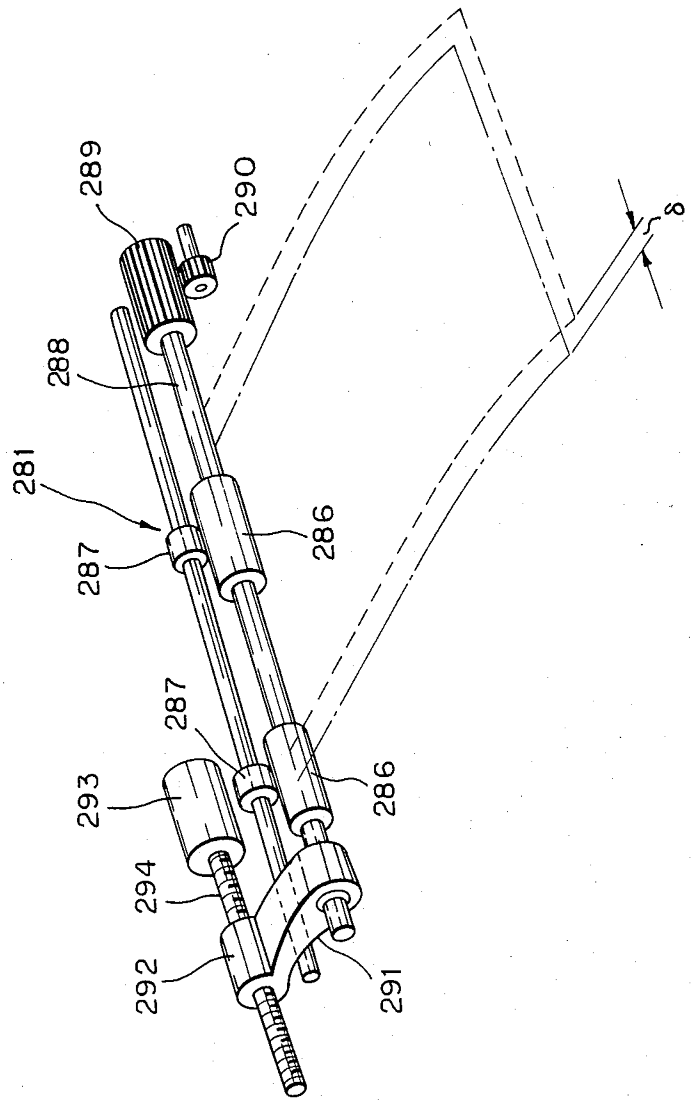
FIG. 32 is a perspective view showing a specific arrangements of a sheet discharge roller.

The discharge roller 281 associated with the discharge unit 271 may be configured in the same manner as the discharge rollers 40 and 45 of the printer upper and lower units 1 and 2, shown in FIG. 19. FIG. 32 shows an alternative and more convenient construction. In FIG. 32, the discharge roller 281 is constituted by a drive roller 286 and a driven roller 287. The drive roller 286 is driven through a driven gear 289 which is mounted on its shaft 288, and a drive gear 290 which is meshed with the driven gear 289. A connecting member 291 is rotatably but axially unslidably mounted on the shaft 288. A nut 292 is provided at the other end of the connecting member 291 and held in threaded engagement with a feed screw 294 which is driven by a reversible motor 293.

Assume that the dash-and-dot line shown in FIG. 32 is representative of a position of a paper sheet which is to be directed toward the discharge tray 9 while the motor 293 is deenergized. As the motor 293 is energized after some paper sheets have been stacked on the discharge tray 9, the feed screw 294 is rotated to move the nut 292 along its axis resulting that the drive roller 286 is moved in the same direction to in turn shift the paper sheet, which is nipped by the rollers 286 and 287, by $\delta$ to the position indicated by a dashed line in FIG. 32.

The paper sheet shifted by $\delta$ as stated above can be distinguished from a group of paper sheets which are discharged to the discharge tray 9 before. In short, the construction shown in FIG. 32 allows a plurality of groups of paper sheets to be readily discriminated on the discharge tray 9.

In practice, as shown in FIG. 30, a sensor 295 is located at the upstream side of the discharge rollers 281. When a signal commanding the shift of a paper sheet as mentioned above is applied to the main controller, which will be described, the motor 293 is energized in response to an output of the sensor 295 which is representative of the detection of the trailing end of a paper sheet, thereby shifting the drive roller 286.

Electrical Arrangement

Figure 24:
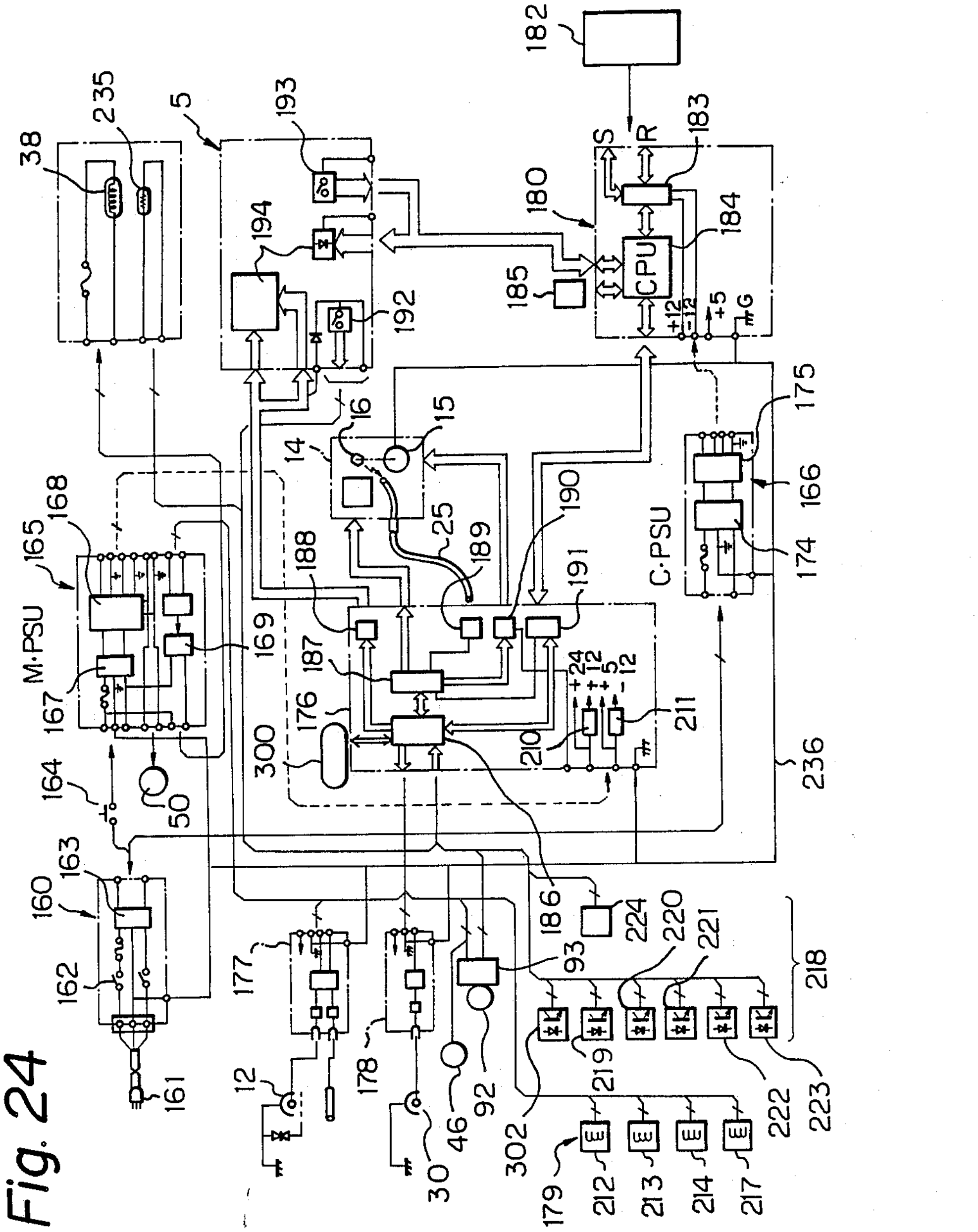
FIG. 24 is a circuit diagram showing a control circuit installed in the printer.

Referring to FIG. 24, a power input section 160 is connected to a commercial power source via an AC plug 161. The power input section 160 has a main switch 162 and a nozzle filter 163 therein. As shown in FIG. 12, the power input section 160 is disposed in an inner part of the lower frame 78. The main switch 162 extends throughout the side wall of the lower frame 78 to the outside so that the operator may operate it. The noise filter 163 is adapted to remove externally derived noise from supplied power. Power from the power input section 160 is applied via an interlock switch 164 to a main power supply unit (main PSU) 165 for the main controller and, at the same time, to a power supply unit for the character controller (character PSU). As shown in FIG. 13, the main PSU 165 is located at the left-hand side of the upper unit frame 47. The main PSU 165 includes a noise filter 167, a constant voltage circuit 168, and a semiconductor relay (SSR) 196. The major function assigned to the constant voltage circuit 168 is AC/DC conversion. The SSR 169 serves to turn ON and OFF current supply for controlling the temperature of the heater 38, FIG. 3, which is accommodated in the heating roller 36. As also shown in FIG. 3, a thermistor 235 is associated with the heater 38. Specifically, when envelopes and other transfer materials having the smallest size are used with the printer, the thermistor 235 is disposed above the transport path for such particular transfer materials for the following reasons. Because envelopes are usually produced by using paste, excessively high fixing temperatures would cause the paste to melt. Thus the thermistor 235 is located closest to a position which the transfer materials having the smallest size are expected to move past, thereby realizing accurate heater temperature control.

As shown in FIG. 12, the previously mentioned interlock switch 164 is disposed at the right-hand side and adjacent to the front wall of the lower frame 78. The interlock switch 164 usually remains OFF and, when pressed down, becomes ON. When the printer is assembled, an inner cover 170 made of resin is mounted in a right portion of the lower frame 78. The inner cover 170 includes a switch cover 171 adapted to enclose the interlock switch 164. The switch cover 171 is provided with a cruciform through bore 172 which is so dimensioned as to admit a pressing member 173 having a suitable shape, FIG. 2, but not operator's fingers and others. In this configuration, when the upper unit 1 is raised as shown in FIG. 2, the interlock switch 164 is turned OFF to interrupt the current application to the main PSU 165; and when the upper unit 1 is closed, the pressing member 173 turns ON the interlock switch 164 to set up the current application. The above-mentioned dimensions of the cruciform bore 172 prevent the operator from accidentally touching the interlock switch 164 while the upper unit 1 is open. When the interlock switch is turned OFF, the application of current to the laser optical device 14 is interrupted to inhibit lasing, as described earlier.

When mounted as stated, the inner cover 170 encloses the feed roller 32, as shown in FIG. 3. Under this condition, the inner cover 170 prevents dust and other impurities from adhering to the feed roller 32 and, at the same time, protects the feed roller 32 when the upper unit 1 is raised.

In FIG. 3, the character PSU 166 is positioned in a right inner part of the upper unit frame 47. As shown in FIG. 24, the character PSU 155 accommodates a noise filter 74 and a constant voltage circuit 175.

The main PSU 165 functions to drive a main controller 176, a power pack 177 for the charger 12 and developing bias (charge and develop PP), a power pack for transfer charger 30 (transfer PP), the main motor 92, and various devices 179. Further, the main PSU 165 drives the ozone fan, suction fan 50 and other fans as well as the fixing heater 38. The character PSU 166 is adapted to drive a character controller 180.

As shown in FIG. 13, the charge and develop PP 177 is disposed in an inner part of the upper unit frame 47. On the other hand, the charger 12 and developing roller 26 which are driven by the charge and develop PP 177 is mounted on the printer lower unit 2 together with, respectively, the drum 58 and developing unit 59, as previously stated in relation to FIGS. 3 and 4. A construction which will be described is adopted to electrically interconnect those devices which are mounted on the upper and lower units 1 and 2.

Figure 25:
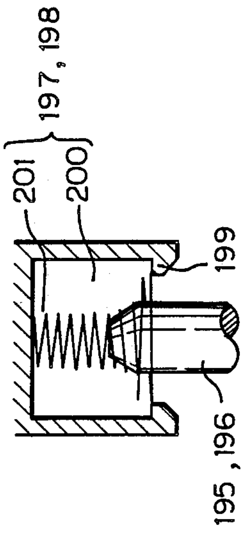
FIG. 25 is a sectional side elevation of a high-tension connection terminal.

Specifically, as shown in FIG. 4(*a*), the charger 12 is provided with a terminal 195 while, as shown in FIG. 7, the shaft of the developing roller 26 is provided with a terminal 196. Power terminals 197 and 198 of the charge and develop PP 177 extend out from the bottom of the upper unit 1, i.e., that of the upper unit frame 47 in such a manner as to correspond to the terminals 195 and 196, respectively (see FIG. 2). As shown in FIG. 25, each of the power terminals 197 and 198 has a circular recess 200 which is provided with an annular pawl 199, and a spring terminal 201 which is preloaded in the recess 200. When the upper and lower units 1 and 2 are closed, each of the terminals 195 and 196 penetrates into the spring terminals 201 of its associated power terminal from below and connected to the latter with the spring terminal 201 wrapping therearound. In this condition, high voltage is applied from the power terminals 197 and 198 to the terminals 195 and 196, respectively. Because the spring terminal 201 is sequentially enlarged in diameter toward the bottom, it surely admits the terminal 195 or 196 and makes good contact with the latter. In addition, the spring terminal 201 which is preloaded by the annular pawl 199 is free from incomplete contact.

Figure 26:
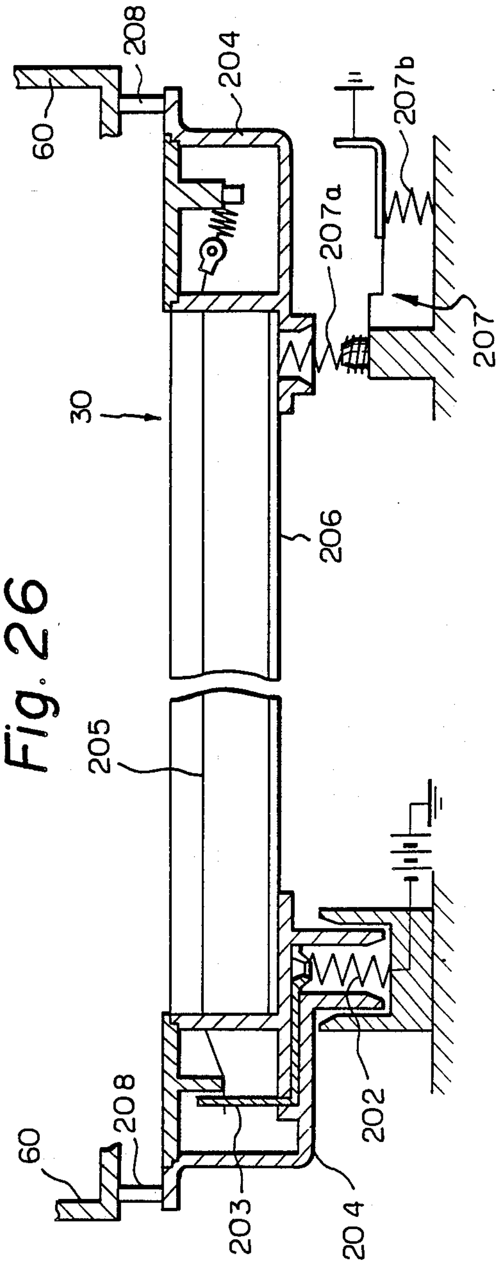
FIG. 26 is a view showing a specific arrangement of a transfer charger.

As shown in FIG. 12, the transfer PP 178 is located next to the transport ribs 124 of the lower frame 78 and, therefore, at the right of the transfer charger 30 as shown in FIG. 3. As shown in FIG. 26, a high-tension terminal from the transfer PP 178 is implemented with a spring terminal 202. The spring terminal 202 is pressed against a terminal 203 which is embedded in an end block 204 of the transfer charger 30, whereby high voltage is applied to a charge wire 205 which is connected to the terminal 203. A casing 206 of the transfer charger 30 is connected to ground by a single spring terminal 207 which has two spring portions 207*a* and 207*b*.

As seen from FIG. 3, the image-forming unit case 60 is situated above the transfer charger 30. As shown in FIG. 26, spacers 208 are mounted on the top and at opposite sides of the transfer charger 30. Hence, the transfer charger 30 is pressed upward against the unit case 60 by the spring terminals 202 and 207*a* through the spacers 208. The spacers 208 are molded integrally with the end block 204 by using mold and, therefore, provided with accurate height. It follows that a spacing which is equal to the height of the spacers 208 is constantly maintained between the transfer charger 30 and the unit case 60, ensuring constant printing conditions.

As shown in FIGS. 13 and 3, the main controller 176 is mounted on a chassis 181 which is installed in the upper unit 1. The main controller 176 controls the general printer process including charging, exposing, developing and transferring steps, as described in relation to FIG. 3. The character controller 180, like the main controller 176, is mounted on the chassis 181. In the character controller 180, character data fed from a host computer 182, FIG. 24, via a centronics interface (S) or an RS232C (R) is applied to a CPU 184 which then generates a character signal corresponding to the character data. As stated earlier, a type matching with the content of a font cartridge 185 which is inserted in the font cartridge inset 6 is selected.

Generally, data from the host computer 182 is fed to the character controller 180 (or sometimes to the main controller 176) by an interface cable. In this particular embodiment, as shown in FIG. 13, a system controller 180 is mounted on the chassis 181 and provided with a connector 253, the interface cable being directly connected to the character controller 180 via the connector 253. Because the interface cable is not laid in the printer as mentioned, there is no fear that noise is introduced in the data from the host computer 182 to cause malfunctions.

The main controller 176 comprises a CPU 186, a phase synchronizing section 187 which is implemented with a gate array, a display driving section 188, a scanner synchronization detecting section 189, a scanner mode driver 190, and a video interface 191.

The display driving section 188 is adapted to drive the control panel 5 . In this embodiment, as also in FIG. 1, the control panel 5 is provided with a rotary switch 192 for informing the CPU 186 of a paper size, a group of button switches 193 for entering various command which are meant for the character controller 180, and a group of LEDs (light emitting diodes) 194 for providing various kinds of indications. As shown in FIG. 13, the control panel 5 is detachably mounted on the front end of the chassis 181 and exposed to the outside through a window 209 of the cover 8. If desired, an arrangement may be made such that the position where the control panel 5 is to be mounted on the chassis 181 is variable. In such a case, if a plurality of windows 209 are formed through the cover 8, the control panel 5 can be moved as desired so as to change the control surface; those windows 209 which are not used may be closed by caps.

The group of button switches 193 include the following switches.

(Font select switch)

A font cartridge (ROM) storing several different kinds of fonts is inserted in the font cartridge inlet 6, as previously described. A font select switch may be operated to select a desired one of such fonts.

(Line on/off switch)

A line on/off switch is adapted to establish and interrupt the transfer of data from the host computer 182 to the character controller 180. In a line-ON mode, data transfer is effected while, in a line-OFF mode, it is interrupted. The line-OFF mode advantageously prevents data from the host computer 182 from being applied during test printing and replacement of the font cartridge, emulation card, etc.

The phase synchronizing section 187 serves to drive the LD of the laser optical device 14 in synchronism with the printing process which is executed by the CPU 186. Another function of the phase synchronizing section 187 is controlling the emission timing of LD in response to a laser beam adapted for the detection of synchronization and received via the synchronizing detecting section 189. This laser beam comes in through the optical fiber 25, as stated earlier. Still another function of the phase synchronizing section 187 is controlling the phase of the scanner motor 16 via the scanner motor driver 190.

A video interface 191 interchanges image data and control data with the character controller 180 and, at the same time, sends to the character controller 180 a clock signal on which the control is based.

Accommodated in the main controller 176 are two voltage converting sections 210 and 211 each comprising a 3-terminal regulator, a DC/DC converter and others. The voltage converting sections 210 and 211 produce voltages of +24 V and +12 V and voltages of +5 V and −12 V, respectively. By these voltages, the motors, solenoids, laser diode, polygon motor and others of the various devices are controlled while, at the same time, the various logic circuits are driven. Such special control voltages are produced in the main controller 176 in order to effect the control by a clean power source which involves a minimum of pulsation. Thus, the emission of the LD, the rotation of the polygon mirror, and others which are included in the printing process are performed without malfunctions, whereby quality printings are achievable.

An option interface 300 is used with the feed unit 266, FIG. 30. Specifically, when the feed unit 166 is used, the timings of start and stop of the feed roller 269 and others are entered through the option interface 300.

The power supply section is divided into the main PSU 165 and character PSU 166 for the following two reasons.

(1) Because the interlock switch 164 is installed, the application of current from the power input section 160 is automatically stopped when the printer upper unit 1 is raised. At this instant, it is advantageous that the data stored in the CPU 184 of the character controller 180 be preserved.

(2) In some printers, the character controller 180 is loaded outside of a casing and not inside. In such a condition, the character PSU 166 in particular is needless.

The various devices 179 shown in FIG. 24 will be operated as follows. A feed clutch 212 controls the rotation of the feed roller 32. A transport clutch 213 controls the rotation of the lower transport rollers 35. A total counter solenoid 214 sequentially increments a total counter 215 which is disposed in a right inner part of the lower frame 78 as seen in FIG. 12 and visible through a window 216 of the inner cover 170. In this embodiment, the program is such that every time the transfer charger 30 is energized in the printing process as executed by the CPU 186 of the main controller 176, the solenoid 214 is actuated to increment the total counter 215 one at a time. The reason why the total counter 215 is incremented based on the transferring operation is that the number of printings produced and the count accurately correspond one-to-one to each other. Should any step other than the transferring step be used for a reference, the number of printings and the count would be brought out of one-to-one correspondence when a paper sheet or sheets are removed due to jamming and other causes.

Figure 15:
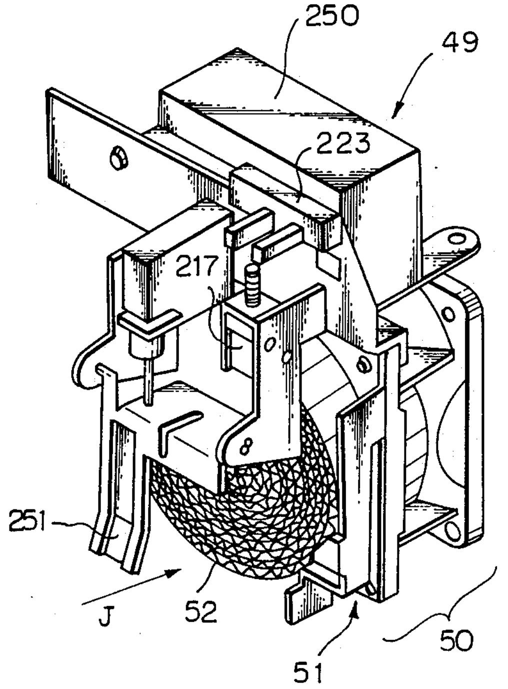
FIG. 15 is a perspective view of a fan unit.

A latching solenoid 217 is installed as one structural element of the suction fan unit 45, FIG. 15, although its function per ce is not directly related to the fan 50. Details of the latching solenoid 217 will be described later.

In FIG. 24, an input device 218 is provided for sending to the CPU 186 of the main controller 176 a signal which constitutes a reference of the process. The input device 218 is made up of a registration sensor 219, a paper discharge sensor 220, a toner over sensor 221, a paper end sensor 222, a latch sensor 223, and a toner end sensor 224.

In FIG. 3, the registration sensor 219 is located at the right of the transport rollers 34 and 35. Based on the timing at which a paper sheet moves past the registration sensor 219, the start timing of the lower transport roller 35 is determined.

The paper discharge sensor 220 is disposed on the downstream side with respect to the fixing device as seen in FIG. 3.

The toner over sensor 221 is mounted on the printer upper unit 1 and positioned above a feeler 225 which is disposed in an upper portion of the toner collecting tank 57, as shown in FIG. 3. As the tank 57 is filled up with waste toner which is removed from the drum 11 by cleaning, the feeler 225 is raised by the toner until sensed by the toner over sensor 221.

In FIG. 3, the paper end sensor 222 is located at the right of the feed roller 32, i.e., above the innermost end of the feed tray 3 so as to sense exhaustion of paper sheets on the tray 3.

The latch sensor 223 is disposed above the latching solenoid 217 as seen in FIG. 15. The latch sensor 223 becomes OFF when the optical path is blocked by a plunger of the solenoid 217, The toner sensor 224 comprises a microswitch, FIG. 2, located in a bottom portion of the printer upper unit 1 such that it assumes a position above a cam mechanism 226 which is provided at one end of the developing unit 50, as shown in FIG. 7. The cam mechanism 225 includes a cam 228 mounted on a rotary shaft of a toner agitating member 227, FIG. 2, which is installed in the developing tank 28, and a lever 230 engaged with the periphery of the cam 228 and rotatable about a pin 229. The lever 230 is pressed against the cam 228 by a spring 231.

As shown in FIG. 3, the toner agitating member 227 agitates toner which is stored in the developing tank 28. Although not shown in detail, the cam 228 is constituted by two cam plates each having a recess. While the resistance to the action of the agitating member 227 is relatively great, i.e., while a sufficient amount of toner is stored in the developing tank 28, the recesses of the two cam plates are not aligned so that the lever 230 abutted against the cam plates is constantly raised to maintain the toner end sensor 224 ON. As the resistance decreases, i.e., as the toner becomes short, one of the two cam plates is angularly displaced and, as soon as the recesses of the cam plates is aligned, the lever 230 falls in the aligned recesses. This turns the toner end sensor 224 OFF to sense the end of toner.

It will be seen from the above that the end of toner is sensed on the basis of ON/OFF of the microswitch which is caused by the upward movement of the lever 230. It is, therefore, necessary that a constant spacing be maintained between the lever 230 and an actuator of the microswitch. To meet this requirement, in this embodiment, the toner end sensor 224 which is implemented with a microswitch is supported by a holder 232 which is produced by bending a spring material, as shown in FIG. 7. The holder 232 is fixed to the printer upper unit 1, and the actuator portion of the microswitch is protruded from the upper unit 1 toward the lower unit 2 (see FIG. 2).

When the upper and lower units 1 and 2 are closed, two projections 233 extending out from the developing unit 59 as shown in FIG. 7 individually urge projections 234 of the microswitch while bending the holder 232 upward. When the upper and lower units 1 and 2 are locked to each other, the projections 233 and 234 are fixed in place spaced from each other by the height of the projections 234 while pressing each other. Consequently, the distance between the lever 230 and the microswitch actuator is maintained constant.

Figure 27:
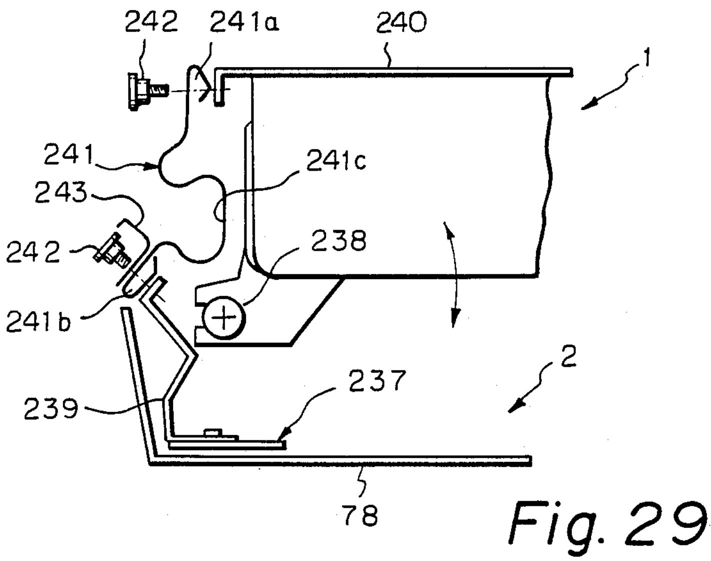
FIG. 27 is a section showing a specific arrangement of a means for connecting the upper and lower units to ground.

In FIG. 2, a line 236 is representative of a grounding line which is connected to the various electrical devices. In this embodiment, as shown in FIG. 27, a grounding base plate 237 is securely mounted to the lower frame 78 of the printer lower unit 2. However, most of the devices shown in FIG. 24 are mounted in the printer upper unit 1, as previously described. Because the upper and lower units 1 and 2 are rotatable about a hinge pin 238 relative to each other, some measure is needed to connect the grounding line 236 laid in the upper unit 1 to the grounding base plate 237 provided in the lower unit 2.

In this particular embodiment, a rigid conductive plate 239 made of metal is connected to the grounding base plate 237 and extended to a position above the lower frame 78. The conductive plate 239 is connected by a connecting plate 241 to a grounding plate 240 which is installed in the upper unit 1. The connecting plate 241 is produced by bending a sheet of phosphor bronze or like material having conductivity and flexibility. As shown, the opposite ends **241*a* and 241*b* of the connecting plate 241 are turned up and fastened to, respectively, the grounding plate 240 and conductive plate 239 by stepped screws 242**, whereby the electrical connection is established.

Due to the use of the stepped screws 242, the connecting plate 241 and the grounding plate 240 and conductive plate 239 are held in contact by the resiliency of the terminals **241*a* and 241*b* themselves and not by the forces of the screws 242. This guarantees good contact permanently despite aging. Further, because the entire connecting plate 241 is provided with a bent configuration, it freely follows any relative movement of the upper and lower units 1 and 2 and, hence, the terminals 241*a* and 241*b*** are free from excessive loads.

There is a fear that the connecting plate 241 touches the screw 242 and others when the printer upper unit 1 is raised, depending upon the shape of a bent portion **241*c* of the connecting plate 241. To protect the connecting plate 241 from damage even in the above condition, a guide plate 243 which extends perpendicularly to the sheet surface of FIG. 27 and has a smooth curved surface that faces the connecting plate 241 may be disposed in the vicinity of the screw 242**.

The power input section 160 shown in FIG. 24 is arranged in the printer lower unit 2. The main PSU 165 and character PSU 166 which are to be connected to the power input section 160 are disposed in the upper unit 1. As shown in FIG. 12, a cable 244 adapted to connect the PSUs 165 and 166 to the power input section 160 is enclosed in a metallic spring tube 245 for protection. The spring tube 245 allows the cable 244 to freely bend due to its flexibility. In addition, because the spring tube 245 is made of metal, it protects the cable 244 against scratches even though the spring tube 245 may rub against the lower frame 78 and/or cover 8, FIG. 13, due to repeated opening and closing of the printer upper unit 1.

Control Process

In this embodiment, the CPU 186 of the main controller 176 shown in FIG. 24 controls and executes a printing process and other various processes which are associated with the printing process. The printing process including the charging, exposing, developing and transferring steps have already been described in relation to FIG. 3.

Hereinafter will be described some important processes which are annexed to the printing process.

(Printing in transfer material of irregular size)

In this embodiment, as shown in FIGS. 1 and 24, a rotary switch 192 is provided on the control panel 5 for entering the size of transfer materials used, e.g., formats A, B and so on. A size other than those regular ones, i.e., irregular size may also be specified when, for example, envelopes of various sizes are used. As the operator rotates the size switch 192 to select a desired size such as B5 or A4, the transfer timing of transfer materials, the arrangement of characters (meaning how many characters can be printed in one page) and others which match with the particular size are set up. For example, as regards the detection of a jam, it is decided that a jam has occurred when any of the registration sensor 219, discharge sensor 220 and other sensors which has sensed the leading end of a transfer material fails to sense its trailing end upon the elapse of a transport time which corresponds to the size of the transfer material. When the size switch 192 is operated to select the irregular size, various timings of printing process which is particular to the largest one of various irregular sizes which may be specified are set up.

So long as any regular size such as B5 or A4 is specified through the size switch 192, the jam detection stated above is performed without any trouble. However, when it comes to the irregular size which the operator may select to print out characters in envelopes and others of various sizes, the jam detection which relies on the registration sensor 219 and others as described above is apt to fail since envelopes and others are usually small in size. In this particular embodiment, when irregular size is selected through the size switch 192, jam detection is not performed and, instead, smooth progress of the printing process is secured. The omission of jam detection is displayed by an LED on the control panel 5.

The program may be elaborated such that when the size switch 192 is operated to select irregular size to print out characters on envelopes, the temperature of the heating roller 36 of the fixing device is maintained lower than that for ordinary printing. This stems from the fact that, because envelopes are usually produced by pasting, excessively high fixing temperatures would cause the paste to melt. However, the fixing temperature should not be too low since excessively low temperatures are apt to incur incomplete fixing. Generally, a reduction by 20% is successful in preventing the paste from melting while ensuring sufficient fixing.

The embodiment has been described that, when irregular size is selected, the jam detecting function is disabled while, at the same time, a printing process which is based on the largest transfer size is executed. Alternatively, an arrangement may be made such that when irregular size is specified, the printing process based on the maximum size is performed for the first transfer material and, once the size of transfer material is sensed while the first transfer material is transported, a printing process is performed on the basis of the sensed size for the second transfer material and onward. Such an alternative procedure would promote high-speed printing in matching relation to the transfer material size

(Notification of size error)

The operator is capable of specifying a paper size by operating the size switch 192, as previously stated. Usually, the size specified through the switch 192 and the size of paper sheets which are loaded on the feed tray 3 are the same. It may occur, however, that those two sizes which should be the same are not the same due to the operator's mistake. In such a condition, if the printing process is executed without any compensatory measure, there may occur that information accommodated in a B5 format are reproduced in paper sheets of format A4 producing an excessively wide blank area in each paper sheet or, conversely, the size of paper sheets is too small to accommodate the number of characters which should be reproduced.

This embodiment eliminates the above occurrences by the following procedure. Namely, when the first paper sheet is fed into the printer after the start of a printing process, its size is sensed and, if the sensed size is not identical with the size which is specified through the size switch 192, the inconsistency is displayed by an LED on the control panel 5 with the printer disabled. Such minimizes the number of defective printings. The first paper sheet fed into the printer is driven out of the printer by discharge roller 40 or 45. It is to be noted that the paper size may be sensed by an exclusive sensor or the registration sensor 219 or like existing sensor.

Upon notification of inconsistency in paper size as mentioned above, the CPU 186 of the main controller commands the CPU 184 of the character controller 180 the preservation of character data which are to be printed out. Otherwise all the print data would be lost.

(Replacement of drum unit)

An OPC counter 250 is disposed in an upper portion of the suction fan unit 49 as shown in FIG. 15 and adapted to count printings with respect to that part of the interior of the cleaning unit 58 which includes the toner collecting tank 57 and cleaning blade 55, i.e., a cleaning unit.

The OPC counter 250 is sequentially incremented by transfer command signals which are output by the main controller 176. When the OPC counter reaches 10,000, a signal representative of that count is fed to the main controller 176 which then produces an indication on the control panel 5 for urging the operator to replace the drum unit 58, e.g. "REPLACE DRUM UNIT". As the toner over sensor 221, FIGS. 3 and 24, senses toner over before the OPC counter reaches 10,000, it applies its output to the main controller 176 for urging the replacement of the drum unit 58.

As shown in FIG. 4(*a*), a drum unit 58 with a fresh drum 11 is provided with a lug 301 on its case 61 for the identification of the unit. In FIG. 2, the lug 301 is sensed by a type sensor 302 which is situated on the bottom of the printer upper unit 1. If the lug 301 is sensed by the type sensor 302 when the "REPLACE DRUM UNIT" appears, i.e., if the drum 11 has not been used 10,000 times, "1 (one)" is displayed together with "REPLACE DRUM UNIT".

Simultaneously with the display of "REPLACE DRUM UNIT—1" as mentioned above, the latching solenoid 217 is energized to lower its plunger resulting that the latch sensor 223 is turned ON. While the latch sensor 223 is ON, "REPLACE DRUM UNIT—1" is continuously displayed. When a reset lever 251 adapted to reset the OPC counter 250 is operated in a resetting direction as indicated by an arrow J, the latch sensor 223 becomes OFF (initial condition).

As the operator replaces the cleaning unit or the drum unit 58 as urged by "REPLACE DRUM UNIT" and, then operates the reset lever 251, the latch sensor 223 is initialized while, at the same time, the OPC counter 250 is reset. Thereafter, the OPC counter 250 starts counting from zero again. Even after the unit has been replaced, the latch sensor 223 is not reset and, therefore, "REPLACE DRUM UNIT" does not disappear unless the reset lever 251 is operated. In short, the latch sensor 223 prevents the operator from forgetting to reset the OPC counter 250.

The indication "REPLACE DRUM UNIT—1" is representative of the fact that the drum 11 has been used 10,000 times by way of example. (Although toner over may be sensed before 10,000 is reached, the volume of the toner collecting tank 57, FIG. 3, is such that the tank 57 is filled up with waste toner when ordinary printing is repeated 10,000 times. Hence, when "REPLACE DRUM UNIT—1" appears due to the detection of toner over before 10,000 is reached, it is regarded that the drum 11 has been used 10,000 times.) Seeing such a display, the operator replaces the cleaning unit which is included in the drum unit 58. The drum 11 is not replaced since, in this embodiment, the drum 11 is expected to withstand 20,000 times of use. The drum 11 is removed from the drum unit 58 so as to discard the cleaning unit alone.

Subsequently, the drum 11 which has been used 10,000 times is loaded in a new drum unit 58 having an empty toner collecting tank 57 and, then, the drum unit 58 is mounted in a predetermined position of the printer lower unit 2. For the new drum unit 58, a case 61 having no lug 301 is selected. As the operator presses the reset lever 251, the latch sensor 223 is initialized and, at the same time, the OPC counter is reset. Thereafter, the OPC counter 250 starts counting from zero again.

As the printing cycle is repeated until the OPC counter has been incremented to 10,000 again or until toner over has been sensed, "REPLACE DRUM UNIT" is displayed again. This time, however, the type sensor 302 does not sense the lug 301 since the case 61 lacks it. Hence, an indication representative of the fact that it is the second replacement of the unit, i.e., that the drum 11 has been used 20,000 times or so is produced, i.e., "REPLACE DRUM UNIT—2". In response, the operator replaces the entire drum unit 58 with a new one.

Transfer and discharge cleaner

Figure 29:
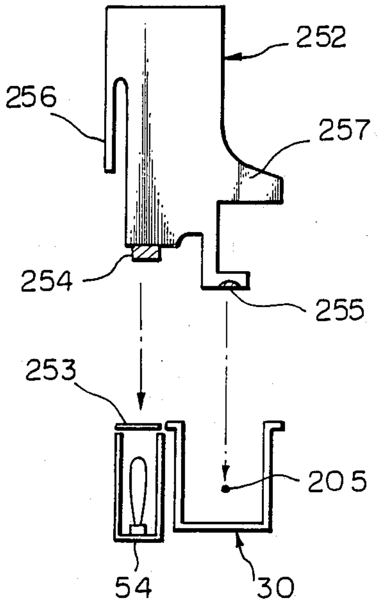
FIG. 29 is a view of a transfer and discharge cleaner.
Figure 28:
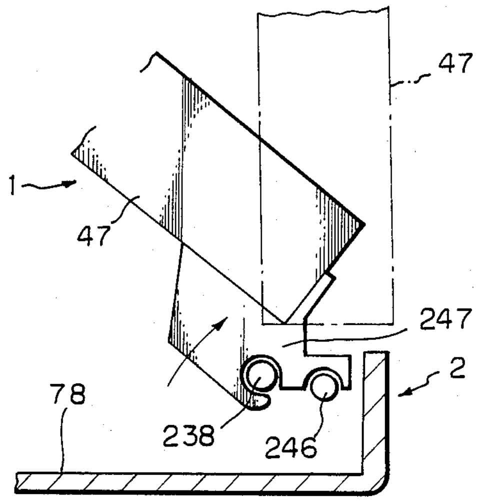
FIG. 28 is a section showing a two-step rotation structure of the upper unit.

As shown in FIG. 3, the lamp 54 and the transfer charger 30 are arranged next to each other. A cleaner 252 constructed as shown in FIG. 29 is provided for cleaning both the lamp 54 and the transfer charger 30 at the same time. As shown, the cleaner 252 includes a piece of felt 254 for cleaning a top transparent plate 253 which is associated with the discharge lamp 54, and a polishing cloth 255 for cleaning the charge wire 205. The polishing cloth 255 may be made of polyurethane rubber by way of example. To clean the lamp 54 and the transfer charger 30, the cleaner 252 is bodily moved perpendicularly to the sheet surface of FIG. 29 with the felt 254 and polishing cloth 255 pressed against the transparent plate 253 and charge wire 205, respectively. This clears the lamp 54 and transfer charger 30 of toner, dust and others. The cleaner 252 is provided with a clip 256 so that it may be hung in suitable position within the printer, and a guide lug 257 engageable with a bulged portion, not shown, of the lower frame 78, FIG. 3, so as to prevent the charge wire 205 from being pressed more than necessary.

In accordance with the present invention, various unprecedented advantages are attainable as enumerated below.

(1) Oscillation of a developing roller is reduced and, yet, a constant contact pressure is maintained between the developing roller and a photoconductive drum, whereby quality electrostatic images are produced.

(2) Even though the developing roller may tend to move toward the drum due to a change in load, a lock plate limits such a movement to thereby secure a constant spacing or a constant contact pressure between the drum and developing roller, ensuring stable development.

(3) By virtue of the constant contact pressure between the drum and the developing roller, an complete image with uniform density is produced.

(4) Adverse influence of noise is eliminated due to direct interconnection of a driver and a motor, and the omission of a cable otherwise needed for interconnecting them promotes a compact design.

(5) Because an upper unit of an electrostatic recording apparatus is rotatable about a hinge, or axis, which is located at an inner side of a transfer material transport path, various structural elements of the apparatus are readily accessible for maintenance and other purposes.

(6) Characters are smoothly printed out even on envelopes and others having irregular sizes by a printing process which lacks a jam detecting function.

(7) Despite that the apparatus is separated into two independent units, the fear of malfunctions is eliminated since an interlock switch is protected by an inner cover.

(8) A first engaging portion and a resilient member are provided integrally with a lock lever, and the resilient member automatically urges the first engaging portion when the lock lever is mounted on a unit. This simplifies the assembly of a locking mechanism.

(9) Because ribs for transporting a transfer material are molded integrally with a case, there is no need for an independent rib member as well as for an extra step for mounting such a member.

(10) Streams of air produced through perforations of a discharge guide member serve to cool a fixing device which is apt to overheat.

(11) The fixing temperature at a particular location which transfer materials of a small size are expected to move past is accurately sensed and, therefore, accurately controlled to a predetermined one.

(12) Ozone is surely dissipated from the vicinity of a photoconductive drum and others.

(13) By the optical dissipation of a charge which is effected from the back of a transfer material, not only the drum but also the transfer material are discharged. This facilitates the removal of remaining toner from the drum and, due to the discharging of the transfer material, allows the transfer material to be separated by its own weight and the curvature of the drum, i.e., without the need for a special separator pawl.

(14) When a lug provided on each detachable device mates with a recess which is provided on its associated support member, a person perceives a click to confirm complete attachment of the device to the support member and, therefore, can start a recording operation without anxiety.

Various modifications will become possible for those skilled in the art after receiving the teachings of the present disclosure without departing from the scope thereof.

What is claimed is:

1. In an electrostatic recording apparatus having a casing in which various devices for executing an electrostatic recording process are accommodated, said apparatus capable of recording data in or on various kinds of transfer materials, said devices comprising at least a photoconductive element assembly and a developing assembly, said photoconductive element assembly comprising a photoconductive element, chargers, and a toner collecting tank, and said developing assembly comprising a developing roller which is detachable from said casing, a toner supply roller, a developing tank, a rotary shaft and connecting lever mounted on said rotary shaft of said developing roller for detachably connecting said developing roller to said casing while limiting up-down movement of said developing roller, and means for exerting a pressure force acting on said connecting lever during connection of said casing with said connecting lever, said pressure force changing to a weaker pressure force after said connection of said casing with said connecting lever is accomplished.

2. The improvement as claimed in claim 1 including driving means for rotating said developing roller during operation of said electronic recording apparatus, wherein said driving means applies a vertically acting force to said developing roller during rotation of said developing roller.

3. In an electrostatic recording apparatus having a casing in which various devices for executing an electrostatic recording process are accommodated, said apparatus being capable of recording data in or on various kinds of transfer materials, at least a photoconductive element assembly and a developing assembly being included in said devices, said photoconductive element assembly comprising a photoconductive element, chargers and a toner collecting tank, and said developing assembly comprising a developing roller which is detachable from said casing, a toner supply roller, and a developing tank, driving means including a drive gear having a shaft, said drive gear driving said developing roller in a rotational motion, said developing assembly further comprising a lock plate for preventing said developing roller from moving away from said shaft of said drive gear by more than a predetermined distance.

4. The improvement as claimed in claim 1, wherein said developing assembly further comprises a horizontal urging means for urging said developing roller toward said photoconductive element assembly at least at two points in a horizontal direction, and a vertical urging means for urging said developing roller in a vertical direction.

5. The improvement as claimed in claim 1, wherein said casing comprises support members and said photoconductive element assembly and said developing assembly are individually detachably supported by said support members and each of said assemblies is individually detachable from said casing independently of the other assembly.

6. The improvement as claimed in claim 5, wherein at least one of said assemblies and said support members is provided with a lug while the other is provided with a recess for receiving said lug when said assemblies are mounted in a predetermined position relative to said support member.

7. An electrostatic recording apparatus comprising a developing device which performs development by using a developing roller having a rotary shaft and is detachably mounted in a body of said apparatus, a connecting lever disposed on said rotary shaft of said developing roller for connecting said body and said developing roller, and force means for exerting a vertically oriented operational force on said connecting lever while said developing roller is driven in a rotational motion while said apparatus is carrying out development, said force means exerting on said connection lever a vertically oriented force while said developing device is being detachably mounted on said body which is greater than said operational force, and wherein said greater force changes to said lesser, operational force upon completion of said detachable mounting.

8. An electrostatic recording apparatus for developing an electrostatic latent image comprising a photoconductive element on which an electrostatic latent image is formed, a developing roller rotationally mounted adjacent said photoconductive element for developing said latent image on said photoconductive element, a drive shaft and a drive gear mounted thereon and engaging said developing roller for driving said developing roller in a rotational motion, and a lock plate engaging said developing roller for preventing said developing roller from moving away from said shaft of said drive gear by more than a predetermined distance.

9. An electrostatic recording apparatus for developing an electrostatic latent image comprising a photoconductive element on which said electrostatic latent image is formed, a developing roller which has a driven end and a nondriven end which are axially spaced from each other, holding means for holding said photoconductive element and said developing roller in contact with each other, drive means located at said driven end of said developing roller and engaging said developing roller for rotationally driving said developing roller, at least two horizontal urging means for urging said developing roller toward said photoconductive element in a horizontal direction, and a vertical urging means for urging in a vertical direction said non-driving end of said developing roller.

10. The electrostatic improvement as claimed in claim 1, wherein said devices are separated into an upper unit and a lower unit, said units being openable away from each other, and wherein said photoconductive element assembly and said developing assembly are in said lower unit and each of said photoconductive element assembly and said developing assembly is individually detachable by hand and without tools from said apparatus independently of the other.

11. An electrostatic recording apparatus for recording data in or on transfer materials comprising:

a casing;

a photoconductive element assembly selectively insertable and removeable from said casing by hand and without tools, said photoconductive element assembly comprising at least a photoconductive element, chargers and a toner collecting tank, said photoconductive element assembly being a unitary structure removeable from said casing as a single unit; and a developing assembly selectively insertable and removable from said casing by hand and without tools, said developing assembly comprising at least a developing roller, a toner supply roller and a developing tank, said developing assembly being a unitary structure removable from said casing as a single unit;

wherein each of said photoconductive element assembly and said developing assembly is individually removeable by hand and without tools from said casing independent of whether or not the other assembly is removed.

* * * * *